United States Patent
Isaacson et al.

(10) Patent No.: US 11,392,930 B2
(45) Date of Patent: *Jul. 19, 2022

(54) SYSTEM AND METHOD FOR PROCESSING GIFT TRANSFERS VIA A SOCIAL NETWORK

(71) Applicant: GiftYa LLC, Pittsburgh, PA (US)

(72) Inventors: Thomas M. Isaacson, Huntingtown, MD (US); Ryan C. Durham, Dunkirk, MD (US); Jason Wolfe, Sewickley, PA (US); Patrick Ledbetter, Arlington, VA (US); Adam Ludwig, San Francisco, CA (US)

(73) Assignee: GIFTYA LLC, Pittsburgh, PA (US)

(*) Notice: Subject to any disclaimer, the term of this patent is extended or adjusted under 35 U.S.C. 154(b) by 13 days.

This patent is subject to a terminal disclaimer.

(21) Appl. No.: 16/679,974

(22) Filed: Nov. 11, 2019

(65) Prior Publication Data

US 2020/0074448 A1 Mar. 5, 2020

Related U.S. Application Data

(63) Continuation-in-part of application No. 15/882,597, filed on Jan. 29, 2018, now Pat. No. 10,489,776, and
(Continued)

(51) Int. Cl.
*G06Q 30/00* (2012.01)
*G06Q 20/34* (2012.01)
(Continued)

(52) U.S. Cl.
CPC ........ *G06Q 20/342* (2013.01); *G06Q 20/10* (2013.01); *G06Q 20/105* (2013.01); *G06Q 20/12* (2013.01);
(Continued)

(58) Field of Classification Search
CPC ..................................................... G06Q 20/34
(Continued)

(56) References Cited

U.S. PATENT DOCUMENTS

| 5,580,196 A | 12/1996 | Thompson |
| 5,590,196 A | 12/1996 | Moreau |

(Continued)

FOREIGN PATENT DOCUMENTS

| GB | 2376787 | 12/2002 |
| JP | 2002/222377 | 8/2002 |

(Continued)

OTHER PUBLICATIONS

ProQuestNPL Search History.*
(Continued)

*Primary Examiner* — John H. Holly

(57) ABSTRACT

Disclosed herein are systems, methods, and non-transitory computer-readable storage media for enabling gift interactions via social media. For example, a user can post to a social networking site in a particular way to establish a gift transfer to a recipient based on a policy, such that when the recipient makes a purchase using their pre-existing payment account, the gift (an amount of money) is transferred or applied to the recipient payment account. A particular structure or feature of a social network post can trigger the creation of the policy, with metadata or information parsed from the social network post providing additional details of the policy. In this way, a user can set up a gift transfer without interacting with a gift portal, application, or website. The recipient does not need to use any special code, separate physical gift cards, or printable coupons to redeem or use the gift.

20 Claims, 11 Drawing Sheets

Related U.S. Application Data a continuation of application No. 15/882,597, which is a continuation-in-part of application No. 14/335,358, filed on Jul. 18, 2014, now Pat. No. 9,881,299, which is a continuation of application No. 14/219,276, filed on Mar. 19, 2014, now abandoned, which is a continuation-in-part of application No. 14/193,068, filed on Feb. 28, 2014, now Pat. No. 8,751,392, and a continuation-in-part of application No. 13/771,791, filed on Feb. 20, 2013, now abandoned, and a continuation-in-part of application No. 13/754,401, filed on Jan. 30, 2013, now abandoned, said application No. 13/771,791 is a continuation-in-part of application No. 13/686,189, filed on Nov. 27, 2012, now abandoned, which is a continuation of application No. 13/470,969, filed on May 14, 2012, now abandoned, said application No. 14/219,276 is a continuation-in-part of application No. 13/301,327, filed on Nov. 21, 2011, now abandoned, said application No. 13/754,401 is a continuation-in-part of application No. 13/175,234, filed on Jul. 1, 2011, now abandoned, which is a continuation of application No. 12/967,253, filed on Dec. 14, 2010, now Pat. No. 8,285,643, said application No. 13/470,969 is a continuation of application No. 12/967,253, said application No. 13/301,327 is a continuation-in-part of application No. 12/967,253, said application No. 14/219,276 is a continuation-in-part of application No. 12/475,122, filed on May 29, 2009, now abandoned, said application No. 14/193,068 is a continuation of application No. 12/075,655, filed on Mar. 13, 2008, now Pat. No. 8,676,704.

(60) Provisional application No. 61/057,106, filed on May 29, 2008.

(51) Int. Cl.

| | | |
|---|---|---|
| *G06Q 40/02* | (2012.01) | |
| *G06Q 20/10* | (2012.01) | |
| *G06Q 20/24* | (2012.01) | |
| *G06Q 20/12* | (2012.01) | |
| *G06Q 20/38* | (2012.01) | |
| *H01L 21/683* | (2006.01) | |
| *H01L 21/687* | (2006.01) | |

(52) U.S. Cl.
CPC ............ *G06Q 20/24* (2013.01); *G06Q 20/34* (2013.01); *G06Q 20/387* (2013.01); *G06Q 40/02* (2013.01); *H01L 21/6833* (2013.01); *H01L 21/68757* (2013.01); *H01J 2237/20* (2013.01)

(58) Field of Classification Search
USPC .......... 705/39, 1.1, 40, 44, 26.1, 41, 35, 42; 380/24, 9, 49, 25, 50; 455/466; 235/380, 235/381
See application file for complete search history.

(56) References Cited

U.S. PATENT DOCUMENTS

| | | |
|---|---|---|
| 5,696,366 A | 12/1997 | Ziarno |
| 5,794,219 A | 8/1998 | Brown |
| 5,848,396 A | 12/1998 | Gerace |
| 5,861,841 A | 1/1999 | Gildea et al. |
| H1794 H | 4/1999 | Claus |
| 5,963,647 A * | 10/1999 | Downing ............... G06Q 20/40 705/64 |
| 5,984,180 A | 11/1999 | Albrecht |
| 6,000,608 A | 12/1999 | Dorf |
| 6,014,634 A | 1/2000 | Scroggie et al. |
| 6,014,635 A | 1/2000 | Harris et al. |
| 6,044,360 A | 3/2000 | Picciallo |
| 6,068,183 A | 5/2000 | Freeman et al. |
| 6,173,269 B1 | 1/2001 | Solokl |
| 6,175,823 B1 | 1/2001 | Van Dusen |
| 6,182,895 B1 | 2/2001 | Albrecht |
| 6,189,787 B1 | 2/2001 | Dorf |
| 6,292,786 B1 | 9/2001 | Deaton et al. |
| 6,321,211 B1 | 11/2001 | Dodd |
| 6,330,543 B1 | 12/2001 | Kepecs |
| 6,370,514 B1 | 4/2002 | Messner |
| 6,408,307 B1 | 6/2002 | Semple et al. |
| 6,454,165 B1 | 9/2002 | Dawson |
| 6,484,148 B1 | 11/2002 | Boyd |
| 6,487,538 B1 | 11/2002 | Gupta et al. |
| 6,505,046 B1 | 1/2003 | Baker |
| 6,526,335 B1 | 2/2003 | Treyz et al. |
| 6,546,257 B1 | 4/2003 | Stewart |
| 6,571,279 B1 | 5/2003 | Herz et al. |
| 6,587,835 B1 | 7/2003 | Treyz et al. |
| 6,594,644 B1 | 7/2003 | Van Dusen |
| 6,601,037 B1 | 7/2003 | Kolls |
| 6,606,602 B1 | 8/2003 | Kolls |
| 6,609,106 B1 | 8/2003 | Robertson |
| 6,672,507 B1 | 1/2004 | Walker et al. |
| 6,711,474 B1 | 3/2004 | Treyz et al. |
| 6,775,539 B2 | 8/2004 | Deshpande |
| 6,795,710 B1 | 9/2004 | Creemer |
| 6,805,289 B2 | 10/2004 | Noriega et al. |
| 6,865,546 B1 | 3/2005 | Song |
| 6,889,054 B2 | 5/2005 | Himmel et al. |
| 6,947,976 B1 | 9/2005 | Devitt et al. |
| 6,970,871 B1 | 11/2005 | Rayburn |
| 7,010,512 B1 | 3/2006 | Gillin et al. |
| 7,021,531 B2 | 4/2006 | Myttenaere |
| 7,039,601 B2 | 5/2006 | Gary |
| 7,089,208 B1 | 8/2006 | Levchin et al. |
| 7,127,236 B2 | 10/2006 | Khan et al. |
| 7,165,049 B2 | 1/2007 | Slater |
| 7,200,566 B1 | 4/2007 | Moore et al. |
| 7,204,412 B2 | 4/2007 | Foss, Jr. |
| 7,213,027 B1 | 5/2007 | Kominek et al. |
| 7,280,984 B2 | 10/2007 | Phelan, III et al. |
| 7,357,331 B2 | 4/2008 | Blossom |
| 7,512,552 B2 | 3/2009 | Karas et al. |
| 7,559,465 B2 | 7/2009 | Rosenblatt |
| 7,593,862 B2 | 9/2009 | Mankoff |
| 7,603,292 B1 * | 10/2009 | Bragg ................ G06Q 30/0609 705/26.35 |
| 7,698,221 B2 | 4/2010 | Blinn et al. |
| 7,792,751 B2 | 9/2010 | Tan |
| 7,831,439 B1 | 11/2010 | Bryar |
| 7,860,789 B2 | 12/2010 | Hirka et al. |
| 7,861,919 B2 | 1/2011 | Spaeth et al. |
| 7,870,022 B2 | 1/2011 | Bous et al. |
| 7,873,573 B2 | 1/2011 | Realini |
| 8,046,266 B1 | 10/2011 | Geller et al. |
| 8,112,315 B2 | 2/2012 | Dooley et al. |
| 8,452,707 B2 | 5/2013 | Sharma |
| 8,473,380 B2 | 6/2013 | Thomas |
| 8,478,638 B2 | 7/2013 | Postrel |
| 8,577,735 B2 | 11/2013 | Wilen et al. |
| 8,589,267 B2 | 11/2013 | Hurst |
| 8,639,629 B1 | 1/2014 | Hoffman |
| 9,760,936 B1 | 9/2017 | Shaw |
| 2001/0039519 A1 | 11/2001 | Richards |
| 2001/0054066 A1 | 12/2001 | Spitzer |
| 2002/0035605 A1 | 3/2002 | Mcdowell et al. |
| 2002/0040438 A1 | 4/2002 | Fisher, Jr. |
| 2002/0042775 A1 | 4/2002 | Nelson |
| 2002/0046341 A1 | 4/2002 | Kazaks et al. |
| 2002/0062246 A1 | 5/2002 | Matsubara |
| 2002/0174016 A1 | 11/2002 | Cuervo |
| 2003/0028515 A1 | 2/2003 | Nishikado et al. |
| 2003/0028518 A1 | 2/2003 | Mankoff |
| 2003/0040959 A1 | 2/2003 | Fei et al. |

(56) References Cited

U.S. PATENT DOCUMENTS

| | | |
|---|---|---|
| 2003/0083941 A1 | 5/2003 | Moran et al. |
| 2003/0130907 A1 | 7/2003 | Karas et al. |
| 2003/0171997 A1 | 9/2003 | Eaton |
| 2003/0182191 A1 | 9/2003 | Oliver et al. |
| 2003/0216960 A1 | 11/2003 | Postrel |
| 2004/0002897 A1 | 1/2004 | Vishik |
| 2004/0073482 A1 | 4/2004 | Wiggins et al. |
| 2004/0078283 A1 | 4/2004 | Gary |
| 2004/0089714 A1 | 5/2004 | Raadsen |
| 2004/0111361 A1 | 6/2004 | Griffiths et al. |
| 2004/0148228 A1 | 7/2004 | Kwei |
| 2004/0162775 A1* | 8/2004 | Winklevoss ............ G06Q 40/00 705/36 R |
| 2004/0203852 A1 | 10/2004 | Janskiraman |
| 2004/2225605 | 11/2004 | Rowe |
| 2004/0249712 A1 | 12/2004 | Brown et al. |
| 2004/0254891 A1 | 12/2004 | Blinn |
| 2005/0075932 A1 | 4/2005 | Mankoff |
| 2005/0092828 A1 | 5/2005 | Phillips |
| 2005/0097005 A1 | 5/2005 | Fargo |
| 2005/0108121 A1 | 5/2005 | Gravett et al. |
| 2005/0108159 A1 | 5/2005 | Gravett |
| 2005/0131761 A1 | 6/2005 | Trika et al. |
| 2005/0177493 A1 | 8/2005 | Sung |
| 2005/0197919 A1 | 9/2005 | Robertson |
| 2005/0199712 A1 | 9/2005 | Rosenblatt |
| 2005/0209958 A1 | 9/2005 | Michelsen et al. |
| 2005/0234771 A1 | 10/2005 | Register et al. |
| 2006/0015405 A1 | 1/2006 | Bala et al. |
| 2006/0059070 A1 | 3/2006 | Petruck |
| 2006/0074767 A1 | 4/2006 | Fortney et al. |
| 2006/0095338 A1 | 5/2006 | Seidel |
| 2006/0122856 A1 | 6/2006 | Rushton et al. |
| 2006/0178932 A1 | 8/2006 | Lang |
| 2006/0208065 A1 | 9/2006 | Mendelovich et al. |
| 2006/0229950 A1 | 10/2006 | Pabbisetty |
| 2006/0253320 A1 | 11/2006 | Heywood |
| 2006/0258397 A1 | 11/2006 | Kaplan et al. |
| 2006/0293963 A1 | 12/2006 | Hoblit |
| 2007/0012759 A1 | 1/2007 | Allarea et al. |
| 2007/0017976 A1 | 1/2007 | Peyret et al. |
| 2007/0022007 A1 | 1/2007 | Lawe |
| 2007/0050711 A1 | 3/2007 | Walker et al. |
| 2007/0063020 A1 | 3/2007 | Barrafato |
| 2007/0073589 A1 | 3/2007 | Vergeyle et al. |
| 2007/0088610 A1 | 4/2007 | Chen |
| 2007/0088801 A1 | 4/2007 | Levkovitz et al. |
| 2007/0103993 A1 | 5/2007 | Mount et al. |
| 2007/0140176 A1 | 6/2007 | Bachenberg |
| 2007/0143177 A1 | 6/2007 | Graves et al. |
| 2007/0150413 A1 | 6/2007 | Morgenstern |
| 2007/0158413 A1 | 7/2007 | Hastie |
| 2007/0168265 A1 | 7/2007 | Rosenberger |
| 2007/0174120 A1 | 7/2007 | Asmar et al. |
| 2007/0175984 A1 | 8/2007 | Khandaker et al. |
| 2007/0179888 A1 | 8/2007 | Angelovich |
| 2007/0192182 A1 | 8/2007 | Monaco et al. |
| 2007/0210152 A1 | 9/2007 | Read |
| 2007/0255620 A1 | 11/2007 | Tumminaro et al. |
| 2007/0255653 A1 | 11/2007 | Tumminaro et al. |
| 2007/0264991 A1 | 11/2007 | Jones et al. |
| 2007/0270165 A1 | 11/2007 | Poosala |
| 2007/0288313 A1 | 12/2007 | Brodson et al. |
| 2008/0004888 A1 | 1/2008 | Davis et al. |
| 2008/0004984 A1 | 1/2008 | Sendo et al. |
| 2008/0010114 A1 | 1/2008 | Head |
| 2008/0010120 A1 | 1/2008 | Chung |
| 2008/0027820 A1 | 1/2008 | Brill |
| 2008/0033817 A1 | 2/2008 | Billmaier et al. |
| 2008/0033857 A1 | 2/2008 | Moses |
| 2008/0040240 A1 | 2/2008 | Covington |
| 2008/0048023 A1 | 2/2008 | Russell et al. |
| 2008/0082424 A1 | 4/2008 | Walton |
| 2008/0091528 A1 | 4/2008 | Rampell et al. |
| 2008/0091535 A1 | 4/2008 | Heiser et al. |
| 2008/0097851 A1 | 4/2008 | Bemmel et al. |
| 2008/0099551 A1 | 5/2008 | Harper |
| 2008/0133257 A1* | 6/2008 | Adkisson ............ G06Q 30/0279 705/329 |
| 2008/0189189 A1 | 8/2008 | Morgenstern |
| 2008/0223922 A1 | 9/2008 | Weitzman |
| 2008/0235122 A1 | 9/2008 | Weitzman |
| 2008/0243628 A1 | 10/2008 | Wiseman |
| 2008/0243630 A1 | 10/2008 | Farney |
| 2008/0255948 A1 | 10/2008 | Garner |
| 2008/0288406 A1 | 11/2008 | Sequin et al. |
| 2008/0301005 A1 | 12/2008 | Nieda et al. |
| 2008/0301044 A1 | 12/2008 | Vardi |
| 2009/0006212 A1 | 1/2009 | Krajicek |
| 2009/0018916 A1 | 1/2009 | Seven et al. |
| 2009/0018959 A1 | 1/2009 | Doran et al. |
| 2009/0032581 A1 | 2/2009 | Esslinger et al. |
| 2009/0048926 A1 | 2/2009 | Salesky et al. |
| 2009/0063295 A1 | 3/2009 | Smith |
| 2009/0094134 A1 | 4/2009 | Toomer et al. |
| 2009/0112709 A1 | 4/2009 | Barhydt |
| 2009/0125410 A1 | 5/2009 | Perlman |
| 2009/0132387 A1 | 5/2009 | Majdoub |
| 2009/0132415 A1 | 5/2009 | Davis et al. |
| 2009/0138397 A1 | 5/2009 | Sharma |
| 2009/0159698 A1 | 6/2009 | Mullen et al. |
| 2009/0164589 A1 | 6/2009 | Shroff |
| 2009/0171683 A1 | 7/2009 | Hoyos et al. |
| 2009/0192928 A1 | 7/2009 | Abifaker |
| 2009/0234771 A1* | 9/2009 | Ledbetter ............ G06Q 20/105 705/41 |
| 2009/0271265 A1 | 10/2009 | Lay et al. |
| 2009/0287579 A1 | 11/2009 | Walker et al. |
| 2009/0307130 A1 | 12/2009 | Tan |
| 2009/0307143 A1 | 12/2009 | Reistad et al. |
| 2009/0313109 A1 | 12/2009 | Bous et al. |
| 2009/0327067 A1 | 12/2009 | Berger et al. |
| 2009/0327129 A1 | 12/2009 | Collas et al. |
| 2010/0010918 A1 | 1/2010 | Hunt |
| 2010/0017278 A1 | 1/2010 | Wilen et al. |
| 2010/0023341 A1 | 1/2010 | Ledbetter et al. |
| 2010/0023418 A1 | 1/2010 | Bader et al. |
| 2010/0036524 A1 | 2/2010 | Chirco |
| 2010/0057580 A1 | 3/2010 | Raghunathan |
| 2010/0076833 A1 | 3/2010 | Nelsen |
| 2010/0106592 A1 | 4/2010 | Brown |
| 2010/0299194 A1 | 11/2010 | Snyder |
| 2010/0299208 A1 | 11/2010 | Carlson et al. |
| 2010/0299227 A1 | 11/2010 | Smith |
| 2010/0299228 A1 | 11/2010 | Smith |
| 2010/0325006 A1* | 12/2010 | White .................. G06Q 20/349 705/26.1 |
| 2011/0004512 A1 | 1/2011 | Postrel |
| 2011/0011931 A1 | 1/2011 | Farley et al. |
| 2011/0016023 A1 | 1/2011 | Zakas |
| 2011/0029370 A1 | 2/2011 | Roeding |
| 2011/0106698 A1 | 5/2011 | Isaacson et al. |
| 2011/0282784 A1 | 11/2011 | Nelsen |
| 2011/0295749 A1* | 12/2011 | Scalisi ................... G06Q 20/10 455/466 |
| 2011/0311164 A1 | 12/2011 | Badharudeen |
| 2012/0029990 A1* | 2/2012 | Fisher .................... G06Q 30/06 705/41 |
| 2012/0066041 A1 | 3/2012 | Mankoff |
| 2012/0066212 A1* | 3/2012 | Jennings ................ H04L 51/32 707/723 |
| 2012/0150728 A1 | 6/2012 | Isaacson |
| 2012/0197716 A1 | 8/2012 | Rampell et al. |
| 2012/0197754 A1 | 8/2012 | Kalin |
| 2012/0226614 A1 | 9/2012 | Guru |
| 2012/0265625 A1 | 10/2012 | Pletz |
| 2012/0316975 A1 | 12/2012 | Schorr |
| 2013/0073369 A1 | 3/2013 | Begum |
| 2013/0096997 A1 | 4/2013 | Benedikt |
| 2013/0132294 A1 | 5/2013 | Schvey |
| 2013/0166445 A1 | 6/2013 | Isaacson |
| 2013/0179268 A1 | 7/2013 | Hu |
| 2013/0211890 A1 | 8/2013 | Heitmueller |
| 2013/0254068 A1 | 9/2013 | Scipioni et al. |

(56) References Cited

U.S. PATENT DOCUMENTS

| | | |
|---|---|---|
| 2014/0019283 A1 | 1/2014 | Daley |
| 2014/0058873 A1 | 2/2014 | Sorensen |
| 2015/0039493 A1 | 2/2015 | Crum |
| 2015/0154587 A1 | 6/2015 | Chetty |
| 2018/0005303 A1 | 1/2018 | Shaw |

FOREIGN PATENT DOCUMENTS

| | | |
|---|---|---|
| JP | 2002/334287 | 11/2002 |
| JP | 2004/265294 | 9/2004 |
| KR | 2002/0070232 | 9/2002 |
| KR | 2002/0094340 | 12/2002 |
| KR | 2004/0076556 | 9/2004 |
| KR | 2006/0061515 | 6/2006 |
| KR | 2006/0083825 | 7/2006 |
| KR | 2007/0030467 | 3/2007 |
| KR | 2010/0045666 | 5/2010 |
| WO | WO 02/073489 | 9/2002 |
| WO | WO 03/014982 | 2/2003 |
| WO | WO 2006/065037 | 6/2006 |
| WO | WO 2013/033266 | 3/2013 |

OTHER PUBLICATIONS

ProQuestDialogNPL Search History.*

"Digital Island Corrects and Replaces Previous News Release, BW2059, Ca-Digital-Island", Business Wire, Jan. 22, 2001.

"AOL Digital City Kicks Off Major Expansion to Widen Lead in Fast-Growing Local Online Market", Business Wire, Mar. 21, 2000.

"WindWire Launches WindCaster; Wireless Ad Network Delivers Marketing and Advertising Over the New Wireless Web Medium", Business Wire, Jun. 27, 2000.

Launch of WindWire Undisputed Success; Leader in Wireless Advertising Solutions Serves Over One Million Ads With Click-Through Rates of More Than 15 Percent in First Week of Launch:, Business Wire, Oct. 17, 2000.

"Alcatel Introduces Advanced Version of Its Intelligent Location-Based Server", Canadian Corporate News, Mar. 20, 2001.

"Smart AdServer Targets Quova for Geolocation Needs; Adserving Innovator Switches to Quova for Reliability and Depth of Data", CCNMatthews Newswire, Feb. 5, 2008.

Susan Glairon, "New Marketing Scheme Brings Online Ads to Boulder, Colo., Wireless Customers", Knight Rider/Tribune Business News, Aug. 6, 2000.

Sarah Littman, "On the Verge: The Users are Catching Up with the Technology in the U.S. Mobile Marketing Arena. Are You Ready to Capitalize on a New Marketing Medium that is Almost Ready for its Close-Up? (Mobile Technology)", Response, Feb. 1, 2008.

"Personalized Information to Mobile Users—Add2Phone and Setec to Co-Operate in Mobile E-Commerce", M2 Presswire, Apr. 20, 2000.

Sarah McCammon, "Ladies, It's Your Night for a Bargain (Neighbor)", Daily Herald (Arlington Heights, IL), Feb. 5, 2004.

"The Next Wave in Advertising", New Straits Times, Jul. 2, 2000.

Sanjay Parekh, "Personalization: Turn Browsers Into Buyers: Gathering Customer Intelligence is an art and a Science (Customer Relationship Management)", e-Business Advisor, Sep. 1, 2002.

"[x + 1] Personalizes Web Optimization with New, Patented Technology", PR Newswire, Sep. 18, 2007.

"Power of Real Time (Brief Article)", Crain's New York Business, Oct. 30, 2000.

Michelle Speir, "BlackBerry pushes a Sweet Solution", Nov. 6, 2000, Federal Computer Week, pp. 40-42.

"Consumers Can Show Their Support for Small Business This Holiday Season on "Small Business Saturday(SM)"". Retrieved from http://about.americanexpress.com/news/pr/2010/sbs.aspx Nov. 28, 2011.

"Developments in cyberbanking" By: Adams, Lee S.; Martz, David J.; Poindexter, Obrea O.—The Business Lawyer 56.3, May 2001.

Horne, Daniel R., "Gift cards: Disclosure one step removed." Journal of Consumer Affairs, 41.2 (2007): 341-350. (Year: 2007).

ProQuestDialogNPL Search History, 7 pages, dated Mar. 13, 2021.

ProQuestNPL Search History, 4 pages, dated Mar. 24, 2021.

ProQuestNPL Search History, 4 pages, dated Apr. 19, 2021.

ProQuestNPL Search History, 6 pages, dated May 8, 2021.

ProQuestDialogNPL Search History, 4 pages, dated Apr. 26, 2021.

ProQuestNPL Search History, 4 pages, dated May 8, 2021.

ProQuestNPL Search History, 54 pages, dated Aug. 10, 2021.

ProQuestNPL Search History, 1 page, dated Jul. 24, 2021.

ProQuestDialogNPL Search History, 52 pages, dated Jul. 16, 2021.

ProQuestNPL Search History, 21 pages, dated May 22, 2021.

ProQuestNPL Search History, 111 pages, dated May 21, 2021.

STIC Scientific & Technical Information Center, EIC Search Report, 10 pages, dated Dec. 16, 2021.

STIC Scientific & Technical Information Center, EIC Search Report, 9 pages, dated Nov. 1, 2021.

STIC Scientific & Technical Information Center, EIC 3600 Search Report, 27 pages, dated Nov. 1, 2021.

STIC Scientific & Technical Information Center, EIC 3600 Search Report, 4 pages, dated Nov. 23, 2021.

STIC Scientific & Technical Information Center, Search Strategy from Dialog, 2 pages, Dec. 18, 2021.

STIC Scientific & Technical Information Center, Search Strategy from Dialog, 4 pages, Apr. 26, 2021.

ProQuestNPL Search History, STIC Scientific & Technical Information Center, EIC 3600 Search Report, dated Oct. 25, 2021, 4 pages.

ProQuestDialogNPL Search History, Mar. 12, 2021, 7 pages.

ProQuestNPL Search History, Mar. 24, 2021, 4 pages.

ProQuestNPL Search History, STIC Scientific & Technical Information Center, EIC 3600 Search Report, dated Aug. 20, 2021, 17 pages.

ProQuestDialogNPL Search History, Aug. 10, 2021, 54 pages.

ProQuestNPL Search History, STIC Scientific & Technical Information Center, EIC 3600 Search Report, Jul. 22, 2021, 4 pages.

* cited by examiner

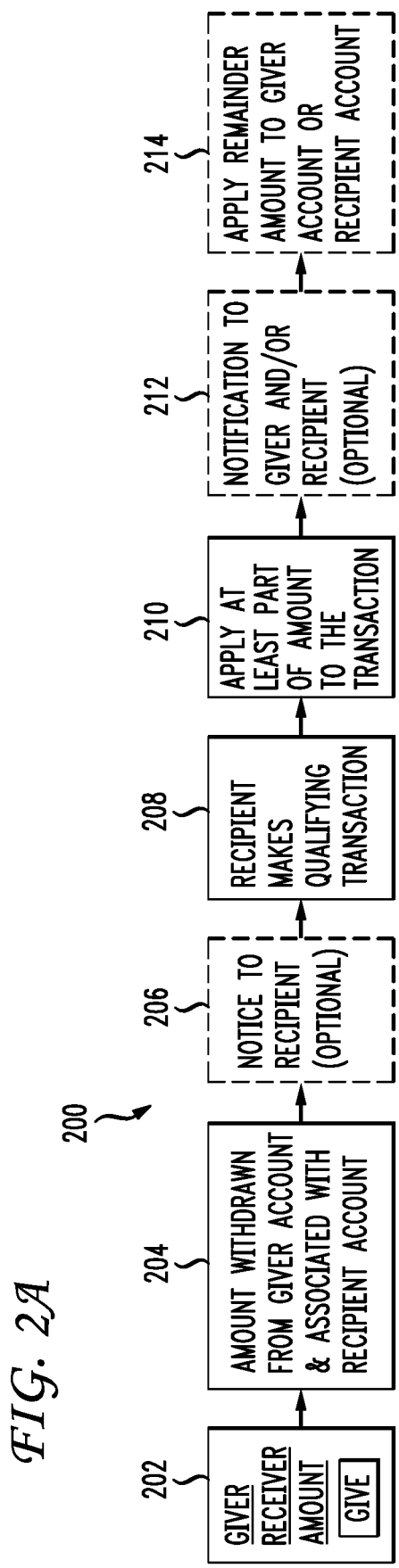

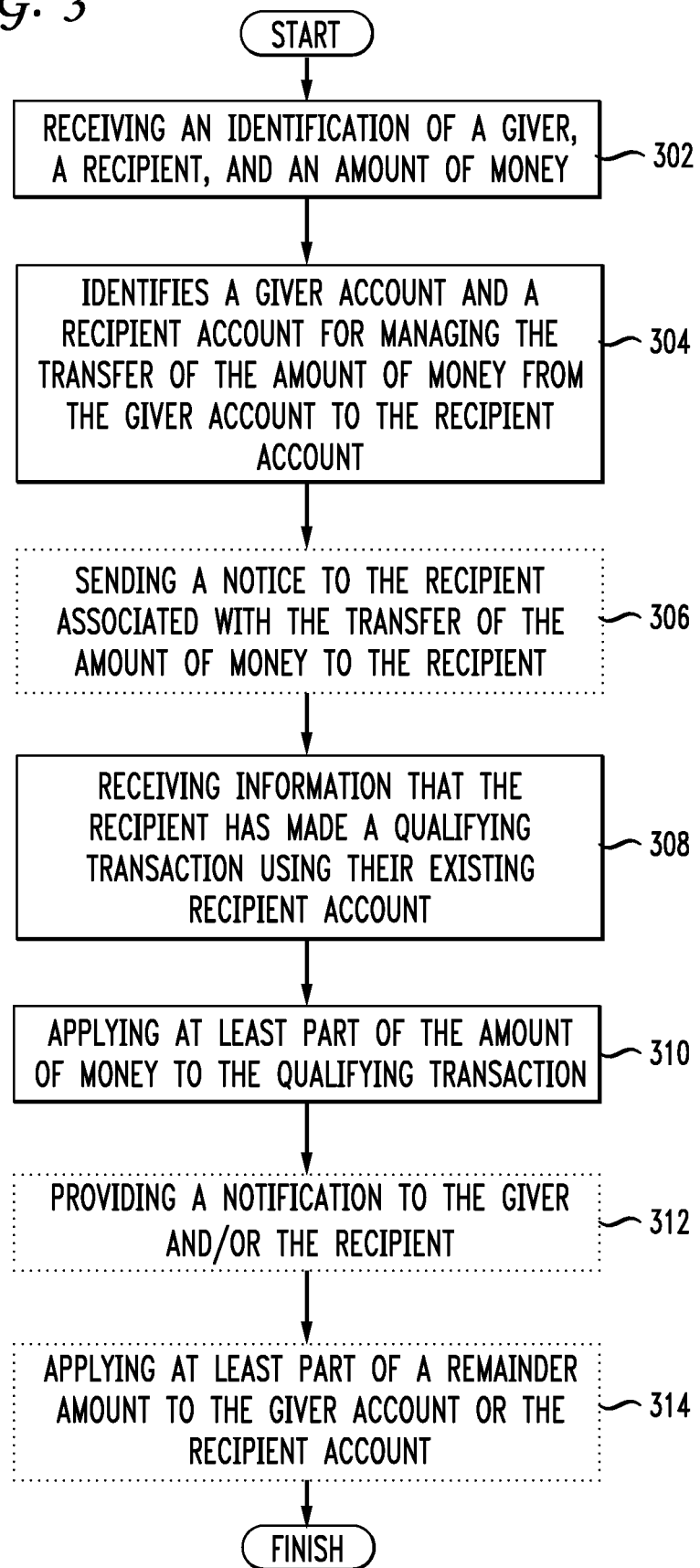

FIG. 4C

| SECURITY | HEADER | GIVER | RECIPIENT | AMOUNT | PAYMENT MODE | TIME | LOCATION | OTHER OPTIONS |
|---|---|---|---|---|---|---|---|---|
| 472 | 474 | 476 | 478 | 480 | 482 | 484 | 486 | 488 |

MESSAGE ENABLING A HASHTAG FOR A GIFT:

FROM RECIPIENT: @ GIFTS TWEET # OUR ANNIVERSARY $20 TO CONTRIBUTE TO OUR 50TH ANNIVERSARY PARTY — 702

MESSAGES TRIGGERING A GIFT

FROM GIVER 1: # OUR ANNIVERSARY $20 TO CONGRATS GUYS! HAVE A GREAT DAY IN JAMAICA! — 704

FROM GIVER 2: # OUR ANNIVERSARY $100 HERE'S TO MANY MORE! — 706

FROM GIVER 3: RT @ RECIPIENT # OUR ANNIVERSARY $20 TO HELP RECIPIENT OUT ON THEIR ANNIVERSARY — 708

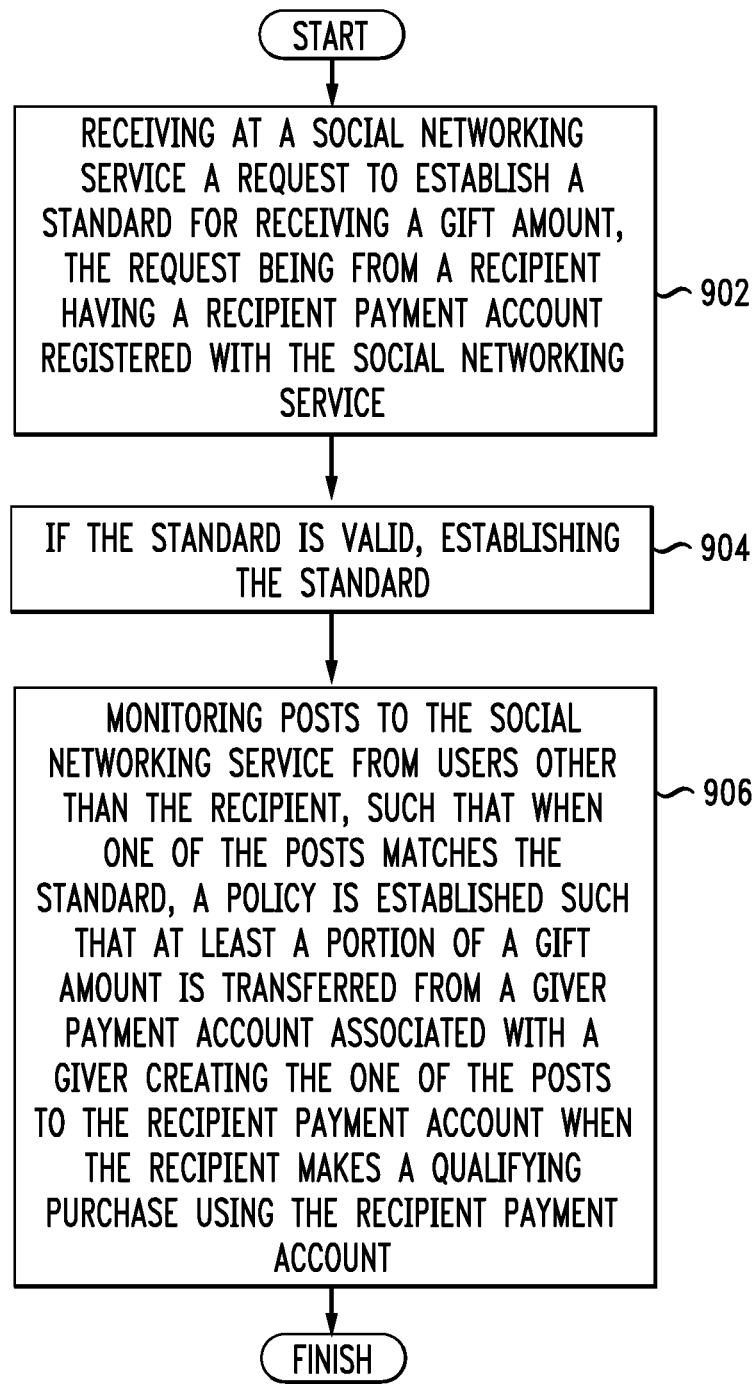

SYSTEM AND METHOD FOR PROCESSING GIFT TRANSFERS VIA A SOCIAL NETWORK

PRIORITY INFORMATION

The present application is a continuation of U.S. patent application Ser. No. 15/882,597, filed Jan. 29, 2018, which is continuation-in-part of U.S. patent application Ser. No. 14/335,358, filed Jul. 18, 2014, which is a continuation of U.S. patent application Ser. No. 14/219,276, filed Mar. 19, 2014, which is a continuation-in-part application claiming priority to U.S. Non-provisional application Ser. No. 14/193,068, filed 28 Feb. 2014, now U.S. Pat. No. 8,751,392, issued 10 Jun. 2014, which is a continuation of U.S. Non-provisional application Ser. No. 12/075,655, filed 13 Mar. 2008, now U.S. Pat. No. 8,676,704, issued 18 Mar. 2014, the contents of each of which are herein incorporated by reference in their entireties.

The present application is a continuation of U.S. patent application Ser. No. 15/882,597, filed Jan. 29, 2018, which is continuation-in-part of U.S. patent application Ser. No. 14/335,358, filed Jul. 18, 2014, which is a continuation of U.S. patent application Ser. No. 14/219,276, filed Mar. 19, 2014, which is a continuation-in-part application of U.S. Non-provisional application Ser. No. 12/475,122, filed 29 May 2009, which claims priority to U.S. Provisional application Ser. No. 61/057,106, filed May 29, 2008, the contents of each of which are herein incorporated by reference in their entireties.

The present application is a continuation of U.S. patent application Ser. No. 15/882,597, filed Jan. 29, 2018, which is continuation-in-part of U.S. patent application Ser. No. 14/335,358, filed Jul. 18, 2014, which is a continuation of U.S. patent application Ser. No. 14/219,276, filed Mar. 19, 2014, which is a continuation-in-part application of U.S. Non-provisional application Ser. No. 13/301,327, filed 21 Nov. 2011, which is a continuation-in-part of U.S. Non-provisional application Ser. No. 12/967,253, filed 14 Dec. 2010, now U.S. Pat. No. 8,285,643, issued 9 Oct. 2012, the contents of each of which are herein incorporated by reference in their entireties.

The present application is a continuation of U.S. patent application Ser. No. 15/882,597, filed Jan. 29, 2018, which is continuation-in-part of U.S. patent application Ser. No. 14/335,358, filed Jul. 18, 2014, which is a continuation of U.S. patent application Ser. No. 14/219,276, filed Mar. 19, 2014, which is a continuation-in-part application of U.S. Non-provisional application Ser. No. 13/754,401, filed 30 Jan. 2013, which is a continuation-in-part of U.S. Non-provisional application Ser. No. 13/175,234, filed 1 Jul. 2011, which is a continuation of U.S. Non-provisional application Ser. No. 12/967,253, filed 14 Dec. 2010, now U.S. Pat. No. 8,285,643, issued 9 Oct. 2012, the contents of each of which are herein incorporated by reference in their entireties.

The present application is a continuation of U.S. patent application Ser. No. 15/882,597, filed Jan. 29, 2018, which is continuation-in-part of U.S. patent application Ser. No. 14/335,358, filed Jul. 18, 2014, which is a continuation of U.S. patent application Ser. No. 14/219,276, filed Mar. 19, 2014, which is a continuation-in-part application of U.S. Non-provisional application Ser. No. 13/771,791, filed 20 Feb. 2013, which is a continuation-in-part of U.S. Non-provisional application Ser. No. 13/686,189, filed 27 Nov. 2012, which is a continuation of U.S. Non-provisional application Ser. No. 13/470,969, filed 14 May 2012, which is a continuation of U.S. Non-provisional application Ser. No. 12/967,253, filed 14 Dec. 2010, now U.S. Pat. No. 8,285,643, issued 9 Oct. 2012, the contents of each of which are herein incorporated by reference in their entireties.

BACKGROUND

1. Technical Field

The present disclosure relates to gift transfers and more specifically to establishing, contributing to, inviting, and otherwise interacting with gift transfer via social networks.

2. Introduction

Gift cards have been used for many years as a mechanism for individuals to give a certain amount of money to a recipient. One example platform that illustrates the current variety of available gift cards is Amazon.com. At the Amazon.com website, a gift card link sends a giver of a gift card to a mechanism in which the giver can purchase gift cards in a variety of forms. Examples include personalized physical gift cards that a giver can print and/or have mailed to a recipient. Amazon.com provides email gift cards in which the giver enters an amount and a quantity and recipient email address with a message. The redemption process is only through Amazon.com or its affiliated website www.endless.com and the website deducts purchases from the gift card balance. They explain that they will place any unused balance in the recipient's gift card account when redeemed. They expressly state that such gift cards cannot be reloaded, resold, transferred for value, redeemed for cash, or applied to any other account, except to the extent required by law. In some cases, even email gift cards from Amazon.com require various steps in order to redeem the gift cards. Amazon.com sends the recipient an email that requires the recipient to click on a link to a principal gift card. In some cases, Amazon.com sends a long gift code to the recipient that the recipient must input in a special gift code field when making a purchase. These long codes can be difficult to enter accurately because they are alphanumeric. Other problems can arise when using any kind of link or code or requiring the user to perform any additional steps to redeem the gift card.

Amazon.com also offers a variety of gift cards from resellers such as Home Depot, Applebee's, P.F. Chang's, and so forth. These physical gift cards are mailed to the recipient and are for a specific amount. Similar gift cards can be printed on a printer for similar use. However, a number of problems exist with these different approaches to gift cards. For example, consider the case when a physical gift card for a restaurant such as P.F. Chang's for $50 is given and the recipient only spends $40 at P.F. Chang's. No easy mechanism exists for the recipient to know how much money is left on a particular gift card. Over time throughout the country millions of dollars are left unused due to this excess money associated with gift cards. Additionally, money is left unused when the recipient fails to keep track of gift cards or throws them away.

As noted in the Nov. 19, 2010, New York Times article "The More Convenient Gift Card", found at http://bucks.blogs.nytimes.com/2010/11/19/the-more-convenient-gift-card/, many solutions are being proposed for making "gift cards easier and more convenient to use", including an iPhone based alternative to manage gift cards. However, the iPhone application requires recipients to upload their gift cards by entering their gift card numbers such that retailers can use the bar codes as shown on the iPhone. The problem of users losing track of gift cards still exists. The article ends with the question "How do you make gift cards more convenient, so you don't forget to use them or don't lose track of them?" This article succinctly summarizes the current state of the art. The current approaches and improvements to gift cards are helpful and make gift cards somewhat easier, but still require complicated steps. Current approaches do not solve the fundamental problem of the recipient forgetting to use a gift card or losing track of a gift card. A solution is required.

SUMMARY

Additional features and advantages of the disclosure will be set forth in the description that follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

This disclosure focuses on a new approach to enabling a giver to give a gift card to a recipient in which the recipient redeems the gift card using the recipient's credit or debit card that they currently own and use. This continuation in part application focuses on an aspect of this basic transaction that can be established using social networks such as twitter. In one embodiment, a system performs the various steps of the process to establish the gift transaction. For example, the system identifies a social media message from a giver having an associated giver payment account that existed prior to the social media message. Data associated with the social media message, such as a hashtag of a tweet, is used to identify a recipient having an associated recipient payment account that existed prior to the social media message. Policy that will govern how recipient payment transactions are monitored and how the gift amount is redeemed can be identified or generated based on the data of the social media message. The system determines a gift amount based on the data monitor purchasing transactions by the recipient using the recipient payment account according to the policy. Thus, when a qualifying transaction occurs in which the recipient purchases an item or service, at least a portion of the gift amount is applied to the recipient payment account.

In another embodiment, the system receives at a social networking service a request to establish a standard for receiving a gift amount, the request being from a recipient having a recipient payment account registered with the social networking service. The system determines if if the standard is valid. If so, the standard is established to manage the gift process. The system monitors posts to the social networking service from users other than the recipient, such that when one of the posts matches the standard, a policy is established such that at least a portion of a gift amount is transferred from a giver payment account associated with a giver creating the one of the posts to the recipient payment account when the recipient makes a qualifying purchase using the recipient payment account.

The underlying transaction of setting up a gift card using a social media message is the gift card transaction itself. Therefore, much of this disclosure focuses on the basic approach of establishing a policy to manage the gift card transaction. FIGS. 5-8 of the present disclosure and associated description provide the support for the claims in this continuation in part application. Such a basic gift card transaction is discussed next.

The present disclosure sets forth solutions to the problem identified in the New York Times of users forgetting to use a gift card or losing track of the gift card. The solution disclosed herein solves the problem by exclusively managing gift cards from givers to recipients electronically such that recipients use their existing credit or debit cards to redeem a gift card. When a giver creates a virtual gift card as set forth here, the recipient will have a pre-existing open-loop credit card or debit card account. That is, the pre-existing account is their normal open-loop credit/debit card accounts that they use for any purchases and thus exist with respect to the timing of when the virtual gift card is created. No recipient payment account is created via the generation of the virtual gift card. Any unused or forgotten amounts on the gift cards can be cancelled or simply transferred to the recipient payment account according to a policy associated by default or tailored by the giver for each gift card. The policy can be implemented centrally at a server or distributed amongst banks or control entities to monitor the purchasing activity of the recipient and apply the gift card amount according to the policy when a triggering transaction or transactions occur or when a qualifying transaction is identified in an analysis of a payment history of the recipient. Applying the gift card amount, depending on the types of accounts involved can include such transactional components as reserving an amount of available credit, reserving an amount of money in an account, transferring money from one account to a holding account, transferring money to a merchant account directly, handling a transaction immediately such as is done with a debit card, handling a transfer of money in a batch mode for a period of time after a qualifying transaction, and so forth. Any combination of these and other transactional components can be applied to carry out the policy for any specific gift card.

The problem set forth above as well as other problems need to be addressed within the art. The present disclosure addresses the issue of enabling interactions with gift transfers via social networks such as Facebook, Twitter, and LinkedIn. Users can directly establish and contribute to gift transfers via social network posts without any interactions with a gift portal.

Also disclosed are various systems and non-transitory computer readable media performing the methods and functions set forth herein. Transitory computer readable media and signals per se also represent other embodiments disclosed.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof that are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2A illustrates an example flow for processing a virtual gift card;

FIG. 3 illustrates an example method embodiment for processing a virtual gift card;

FIG. 4C illustrates an exemplary packet structure for communicating virtual gift card transactions with a server;

FIG. 7 illustrates example Twitter messages for establishing, contributing to, and spreading gifts via a social media outlet;

FIG. 9 illustrates a second example method embodiment.

DETAILED DESCRIPTION

Figure 1:
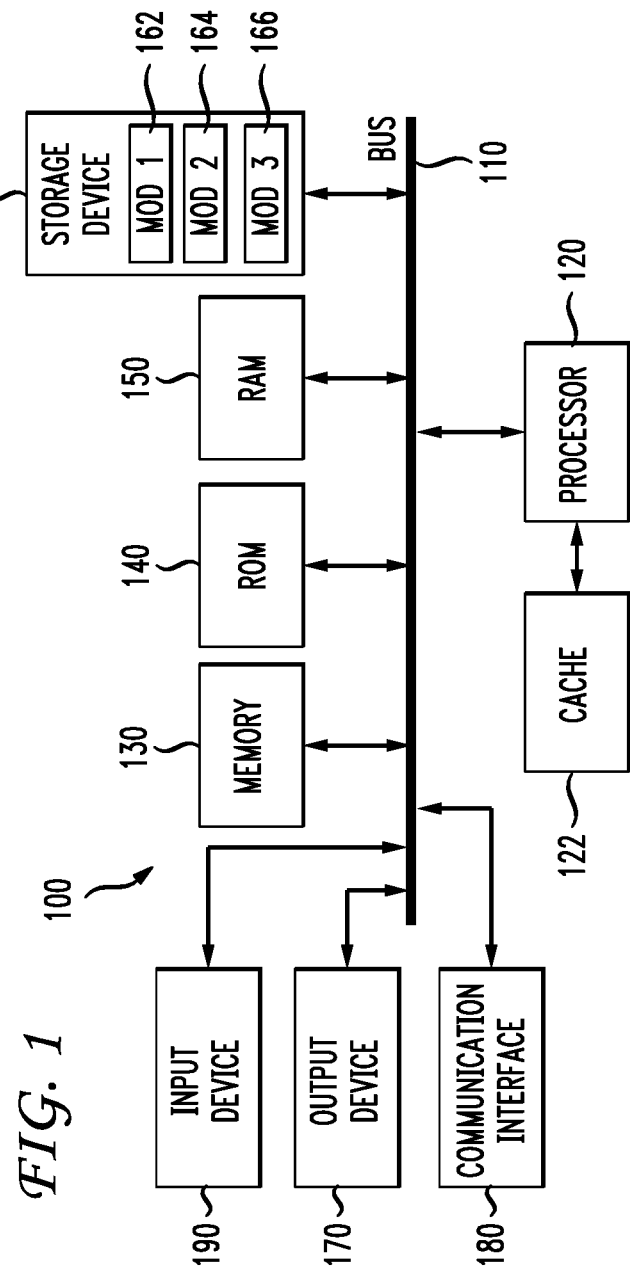
FIG. 1 illustrates an example system embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Any particular function disclosed in connection with one embodiment or aspect can expressly be integrated into another disclosed embodiment, function or aspect. This disclosure considers mixing and matching of the various functions although particular functions are not specifically discussed in one example.

The present disclosure addresses the need in the art for removing hurdles in giving, redeeming, and processing gift cards and particular to gift cards that are given and redeemed without a physical gift card or gift code. A brief introductory description of a basic general-purpose system or computing device in FIG. 1 that can be employed to practice the concepts is disclosed herein. A more detailed description will then follow of the various credit/debit processing infrastructure, the exemplary methods, and other financial processing infrastructure and concepts in conjunction with virtual gift cards that are redeemed using an existing payment mechanism transparently, that is, without any additional physical gift card, gift certificate or any gift code. A recipient of a virtual gift card can simply purchase a qualifying good or service with her Visa card, for example, and the payment processing infrastructure associated with the Visa card applies the virtual gift card amount automatically to the transaction. This disclosure involves more than just a direct transfer of money from one person to another, or from a gift card to a credit card account, but rather focuses on a gift card approach in which a gift card is established at a first time having a policy, and a recipient, at a second time that is later than the first time, executes a purchasing transaction according to the policy. When that transaction is detected, the system will implement the policy and apply the gift card funds at a third time which is later than the first time, and can be approximately around the second time or later than the second time. The implementation and use of such a policy to guide/manage gift card payment through a recipient's use of an existing account introduces many novel features that are disclosed herein.

The policy can include at least one of: a class of goods or services, an amount of money, a merchant or group of merchants, a ceiling amount of money to be used in the gift card, a time frame for use of the gift card, one or more recipient payment accounts that when used can trigger the transfer of money from the giver payment account to the one or more recipient payment accounts, and a predetermined period of time in which if all the amount of money associated with the gift card is not used according to the policy, a remainder amount of money is transferred from the giver payment account to the recipient payment account. The giver payment account and the recipient payment account are separate and independent from each other, such as a giver's American Express credit card and a recipient's Visa debit card. The giver payment account and the recipient payment account can exist prior to the gift, any transfer of money, and/or initial phases of the gift creation process, and can be associated with a user profile on a gift platform.

A new result of this approach is to render a recipient open-loop credit/debit card account into a hybrid open-loop/closed-loop account. The system monitors the activity of the account such, that for average purchase, the account is open-loop and not restricted, but the application of the gift card to specific purchases according the policy is considered closed loop.

For the sake of clarity, the methods herein are discussed in terms of an exemplary system 100 as shown in FIG. 1 configured to practice the method. The steps of each method outlined herein are exemplary and can be implemented in any combination and/or permutation thereof, including combinations that exclude, add, or modify certain steps. These and other variations are discussed herein as the various embodiments are set forth. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high-speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs hard disk 160, those skilled in the art should appreciate that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general-purpose DSP circuit, may also be provided.

The logical operations of the various embodiments are implemented as: (1) a sequence of computer-implemented steps, operations, or procedures running on a programmable circuit within a general use computer, (2) a sequence of computer-implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

The term "system" or similar terms also apply to the herein disclosed systems for processing various types of transactions. There are differences in systems for processing credit card and debit card transactions. It is assumed that with the policies and processing disclosed herein, that appropriate adaptations are made for specific systems where necessary. Those of skill in the art will understand the hardware components used for accomplishing such transactions.

The physical systems performing the functions disclosed herein can be found in any geographic location. For example, one or more of the banks, servers, and physical infrastructure performing the steps herein may be outside the United States. Therefore, all processes should be interpreted as also including the concept of a recipient performing a purchase in the United States, communications leaving the United States (confirmation, authorization, instructions, etc.) for a foreign entity, and communications being received from the foreign entity that achieves the results discussed herein.

Virtual Gift Cards

Having disclosed some components of a computing system, the disclosure now turns to FIG. 2, which illustrates an example flow 200 of the basic approach disclosed herein for processing a virtual gift card. The embodiments disclosed herein are discussed in terms of an exemplary system 100 or computing device as shown in FIG. 1 configured to practice the various embodiments. A more specific exemplary system for implementing this flow 200 is illustrated in more detail in FIG. 4 with respect to a control engine that manages the redemption and processing of each gift card according to its policy via communications and instructions with various accounts and/or merchants accounts. Feature 202 represents a giver interface. An example will be used to step through the various blocks. Assume that a giver desires to give a $50 virtual gift card to a recipient. The interface 202 enables the giver to either input identification information and recipient payment account information or have it prepopulated based on a previous login. The interface 202 can be a web interface, a software client interface, a point of sale interface that a store employee uses on behalf of a giver, a self-service kiosk, a voice-based interface, an interface via a handheld device, a multi-modal interface, speech interface, or any other suitable interface. The system 100 identifies, via the giver selection, a predictive approach, or some other approach, a recipient such as a mother, sister, or friend of the giver, etc., and an amount that the giver desires to give to the recipient. The recipient credit/debit card data/account is identified via a secure communication to a database or inserted by the giver or recipient if necessary or possible. Through one or more different methods, the giver payment account and recipient payment account are identified.

The timing of the creation and redemption of the gift card is relevant. In one example, the creation of the gift card by the giver occurs at a first time, say Monday morning at 9:00 AM. The policy is established at that time or perhaps relatively close to that time, such as the gift card is good for purchases at restaurants. The recipient then will at a second time, which is later than the first time, execute a purchasing transaction at a restaurant, say Friday night at 6:00 PM. The policy can then be implemented (money transferred, paid, etc.) at the time of the transaction around Friday at 6:00 PM, or the system may scan the recipient transaction history say every Saturday to determine whether qualifying transactions exist. Assuming that the system can identify restaurant transactions on the recipient transaction history, it would then detect the Friday night restaurant purchase and implement the policy for that purchase.

The recipient bank might desire such scanning of the recipient purchasing history to remain anonymous. In this case, a secure communication between a central control entity and the recipient payment account holder can simply provide higher level policy data. For example, a participating recipient bank can have a module in place to perform such scanning and receive data from a central control entity to monitor Rachel's account for purchases at the Olive Garden and notify us of such a purchase. Rachel's bank or credit card issuing entity can then monitor her account and simply provide the basic data of such a transaction at the level needed. For example, the control entity can instruct the bank that the gift card is for $40 at Olive Garden and to monitor for 6 months and report back (1) whether a purchase was made at Olive Garden, and if it was under $40, then the amount, or if it was over $40. Assume one month later Rachel makes a $42 purchase at Olive Garden. Her bank can notify the control entity that a purchase was made for over $40 dollars (thus maintaining the secrecy of the total amount). The control entity can then apply the policy for the entire gift card. If Rachel spent $35, her bank can report the purchase and the amount as $35. The policy then causes $35 of the gift card to be applied to the transaction and maintains the record that $5 is still available. If after 6 months no other purchase is made by Rachel, the control entity can simply transfer the rest of the funds to Rachel's account or take some other action based on the policy. Since Rachel's bank was instructed to monitor her accounts for gift card related activity for six months, once the six month expires, that monitoring simply expires as well. This approach can simplify and separate the implementation of the policy from a control entity and a giver or recipient bank.

Preferably, the interface has access to the giver and recipient payment accounts such that the giver does not have to enter credit/debit card or checking account information. Either way, the interaction can confirm to the giver that a sufficient level of information exists to carry out the gift card transaction. This can include that an authorization communication has confirmed that the recipient has a valid credit/debit card. The specific recipient card to be used to redeem the gift card can be provided, optionally without the card number, to the giver. The interface can optionally tell the giver that the recipient Visa credit card is to be used for the gift card or can enable the giver to select which payment mode the recipient should use. I.e., the system may instruct the giver that the recipient's Visa Credit card and Master-Card Debit card are both available, and to choose which one is to be used. The giver can click a "give" button that begins the transaction. Upon triggering the transaction, information is transmitted to block 204 that will withdraw, hold the amount ($50), or reserve in a line of credit from a giver payment account and associate it with the recipient credit/debit card account and the policy for managing the gift card. The particular process of retrieving the gift card amount from the giver payment account will depend on the type of account is used or other policy considerations. Applying the gift card amount, depending on the types of accounts involved, may include processes as reserving an amount of available credit, reserving an amount of money in an account, transferring money from one account to a holding account, transferring money to a merchant account directly, handling a transaction immediately such as is done with a debit card, handling a transfer of money in a batch mode a period of time after a qualifying transaction, and so forth. Any combination of these and other transactional components can be applied to carry out the policy for any specific gift card.

If the recipient does not have an account, the system can either send a notification to a recipient indicating that someone wants to give them a virtual gift card and encouraging the recipient to set up an account. If the recipient does not have an account because the recipient is a child, for example, who is not old enough to have a credit/debit card, the system can suggest to the giver a suitable proxy recipient who has an account, such as a parent or guardian. If the recipient is unable or unwilling to set up an account and no suitable proxy recipient is available or known, the system can take some default action. The default action can include mailing a check or a traditional physical gift card to the recipient.

The information received from block 202 is sufficient to identify a giver payment account from which to draw or hold the $50 for giving to the recipient. Also, the information received from block 202 can identify a recipient payment account such as a bank account, credit/debit account, specialty credit card such as a Macy's credit card or an Old Navy credit card, online payment account, or other suitable device or mechanism associated with purchases and/or payments so that the recipient can receive the money. As noted above, the terms "credit card" and "debit card" encompass credit cards and debit cards as well as PayPal, cash, club cards, checks, merchant-specific credit cards, and other payment modes as well. Accordingly, in block 204 the system identifies and associates the various accounts with this virtual gift card in preparation for completing the transaction. Optional block 206 involves sending a notice to the recipient. Because no physical gift card is given, if the giver wants to give a virtual gift card of $50 to the recipient for use at a restaurant, such as Olive Garden, the system can provide an email or other notification via text or voicemail or other mechanism. One example notification simply states "George has given you a $50 virtual gift card to Olive Garden, please use your Visa and $50 will be applied to your purchase at Olive Garden." No interaction is necessary with any notification. Indeed, no notification is required for the transaction to work. The recipient may only know about the gift card after it is redeemed, or when the giver or the system tells them. The merchant can inform the recipient when the virtual gift card is redeemed as well. The redemption of the gift card is independent of any communication to the recipient or of any notification mechanism although accessory features, upselling, or optional variations to the policy of the gift card can be applied through such notifications and interactions between the giver and/or seller that can occur via such communication.

A policy associated with the gift card can be as simple as applying the gift card amount to the transaction by the recipient at any merchant. Other policies and variations are further disclosed. Several other aspects are associated with the optional notification 206 to the recipient. As has been noted, the notification is optional inasmuch as the information associated with the giver and the recipient is already obtained and can be processed without any automatic or other notification at all. The giver can simply call up the recipient and tell the recipient that the recipient got a $50 virtual gift card for use at Olive Garden and all the recipient needs to do is use their credit card or any of the designated payment modes or accounts. As noted above, the giver interface can notify the giver that the card is redeemable through the recipient's credit card. The policy can cover several accounts and a multitude of scenarios. The gift card is redeemable through using the recipient's credit/debit card at the merchant as though they were making a normal payment without the existence of the gift card. The policy is implemented through control mechanisms on a server, distributed at various banks, or associated with the various banks involved to monitor the recipient purchasing activity to identify a triggering transaction to implement the policy of the gift card. For example, the recipient credit card account can have a monitoring module associated with it when a gift card is redeemable with that account. The monitoring module can identify when a purchase is made and notify a central control entity, which can cause the system to apply the gift card funds according to the policy.

In another aspect, however, given the framework disclosed herein, email or other electronic notification to the recipient can provide other features. The email can be a simple notification such that the recipient does not have to interact with the email at all in order to use the virtual gift card. The notification can have no mechanism (or no mandatory mechanism) for feedback, reply, or confirmation. In other aspects, communication or interaction with the recipient can be desirable for security or other purposes. For example, the email can provide some information such as "George has given you a $50 virtual gift card to Olive Garden. Do you know George and do you want to accept this gift card?" The system can require the recipient to click a confirmation button link or perform some other interaction to confirm that the recipient desires to use the gift card. Interactions with the notification can modify or confirm the policy. The recipient may receive a communication that says, "George has given you a virtual gift card for $50, do you want to redeem it through your Visa credit card (and add $5) or through your debit card (and add $3)." Based on the selection of the recipient, the policy is established and accessory features are added, if any. These interactions are optional and, even when present, the interactions, communications, and notifications with the recipient are not required for redemption of the virtual gift card.

As a value-added service, the system can, as part of the interaction, allow the recipient to reserve a table at Olive Garden, invite others to join the dinner at Olive Garden, show a custom menu including updated prices for items based on the gift card amount (which would be free for items under $50), a meal planner application to see an estimated total cost (after the $50 virtual gift card) of a specific set of items (such as an appetizer, two entrees, drinks, dessert, etc), and the like. The interactions can include verification questions to further confirm that the recipient is the appropriate person and that they know the giver, and so forth. Those of skill in the art can understand various mechanisms for confirming and authorizing the transfer of funds from the giver to the recipient.

In yet another aspect, the notification 206 can include options presented to the recipient for how the gift card will be managed. The notification to the recipient can state, "George has provided you with a $50 virtual gift card to any restaurant of your choice. If desirable, please select from the following options." In this example, the giver did not specify a particular restaurant but only provided that the gift card was for the recipient to go out to dinner. Thus, the card was provided for a class of goods or services (food). The notification is one opportunity for specific restaurants (as members of the class) to seek to obtain additional business. The notification can include an option selectable by the giver or the recipient, e.g.: for Olive Garden, Red Lobster, or P.F. Chang's. Additionally, communication with the various databases associated with these restaurants can include additional information such as P.F. Chang's offers an additional $5 if the virtual gift card is used at P.F. Chang's. This provides an upselling opportunity available to the merchants. The method can include receiving information associated with a giver giving a virtual gift card for a class of items such as restaurants, or hardware stores, or grocery stores, etc. Data is then retrieved for the specific species of that class and potential offers that can be associated with each of those species.

Thus, a database is accessible while processing the gift card, in which offers from Olive Garden, P.F. Chang's and Red Lobster are determined to be available. Options can be presented to the giver for selection to upsell or cause them to want to add the offers to the base gift card. These offers are combined with the notification that is sent to the recipient, if any optional notification is sent. The system presents a communication to the recipient and receives a selection of one of the species. Assume that the recipient sees an offer for the Olive Garden in which an additional $5 is added to the virtual gift card amount. The system then handles the entire transaction such that when the recipient uses their credit/debit card at the Olive Garden. The $50 is applied to the transaction as well as an additional $5 from the Olive Garden. This $5 can be a coupon discount or an additional transfer of money to the recipient's account from the Olive Garden or some other entity during or following the transaction. The policy can manage the final transaction with all the various participants, giver, recipient, merchant, and others.

The system can present an additional option in the communication where the recipient does not select any of the species of the class but merely desires to receive the virtual gift card for use at any restaurant. This option can be a default setting. In such a case, the recipient receives the notification they received a virtual gift card for a restaurant but selects no specific restaurant. The next time the recipient goes to any restaurant and uses an appropriate payment mechanism according to the policy for the gift card, the system (such as an acquiring bank or other node or control engine in the system) applies the virtual gift card for $50 to that transaction and the species options which were presented in the communication are cancelled at that stage and no longer viable.

Where a genus (such as restaurants) are applied in the policy, and where the system scans the recipient transaction history to determine whether a triggering transaction exists, there may be some ambiguity in the recipient payment history regarding whether a purchase was at a restaurant. In such a case, the system may initiate a confirming interaction via a communication with the recipient to confirm that the purchase last night at 6 PM at "Mama Lucia's" was a restaurant. If that is confirmed by the recipient, then the system implements the gift card policy for that transaction.

In one aspect, the virtual gift card is associated with a group of payment mechanisms for a single giver and/or recipient or for multiple givers and/or recipients. For example, the virtual gift card can be tied to a VISA debit card and an American Express credit card. A transaction at the restaurant using either one can trigger the application of the funds associated with virtual gift card to the recipient payment account, the merchant account or in any other fashion. In another aspect, the virtual gift card is tied to a checking account shared by a husband and a wife as a recipient pair. A transaction at a restaurant made via either spouse's check card or a physical check can trigger the virtual gift card. The giver can specify a recipient routing number, such as the routing number printed on the bottom of a physical check, so that the system can apply the virtual gift card to the recipient's checking account. A debit card used on that checking account can also trigger the gift card transaction. In each case, the virtual gift card can have a policy associated with its redemption that the system monitors recipient purchasing transactions and follows with respect to transferring funds.

When the system receives information associated with the giver and the recipient, the species options that are presented in the above scenario can also be geographically selected. The location of the recipient is known based on information in the database, a mobile device location, a recent purchase, and/or other sources, and the system can identify and present an initial set of specific businesses to the recipient. This option can also be dynamic. A recipient living in Virginia can be notified of receipt a virtual gift card for any of a series of species restaurants that are within 10 miles of their home. If the recipient travels to Italy, and use of their credit card or other location-based mechanism indicates that they are now in Rome, a follow up email can be provided with a new set of offers associated with restaurants within the vicinity of where the credit card is actually being used. In this scenario, the earlier offer can be cancelled, modified, or maintained. In any event it is preferable that once in Italy, if the restaurant in Italy provides an additional upsell offer for use in association with the virtual gift card, then once that payment mechanism is used according to the new offer, all offers are then cancelled and considered fulfilled. The merchants can attach additional limitations to their upsell offers as well, such as "minimum $25 purchase", "valid until November 31$^{st}$", "for use at the Baltimore location" or "valid Wednesdays only". These variations represent different features illustrating how the policy can manage any given gift card. As can be appreciated, the variety of policies that can be applied to a gift card to manage how its payment is triggered is endless and all such variations are considered within the scope of this disclosure. Policies can mix timing, geography, classes/species of goods and services, individuals, groups of purchases (i.e., a series of items purchased that are related or associated according to the policy) and so forth.

Location-based data can also trigger an offer to a giver. Assume a recipient, Rachel, who previously received a gift card for the Olive Garden from a giver George, is again at the Olive Garden. Rachel's location as identified by her mobile phone, either automatically or manually such as based on a check-in to FourSquare, can trigger a notice to George that states, "Rachel is at the Olive Garden. Do you want to treat her to dinner?" A preauthorized offer already associates the giver payment account to the recipient payment account. If George says "Yes" or otherwise confirms the notice, the system can trigger the transaction. A communication to Rachel of any type, including a connected telephone call, can notify Rachel that George is treating her to dinner and to use her Visa card in the normal fashion. However, no communication is necessary.

The system can notify the merchant from which the recipient is making the purchase, such as Red Lobster. Location-based services can identify that the recipient of a Red Lobster gift card is at a Red Lobster location. The notification can inform the wait staff at Red Lobster that it is the recipient's birthday and request that they sing "Happy Birthday" to the recipient. Alternatively, the notification to the merchant can provide some information regarding recipient preferences for food, products, or service, such as "the recipient prefers Diet Coke with no ice". Then the wait staff can act on the notification information to provide customized service to the recipient in such a way that the experience is a pleasant surprise to the recipient. In this manner, the merchant can know of people who are at their location and have gift cards. Such data can provide the merchant with a mechanism to identify the recipient, such as a photo because the recipient has yet to use their credit/debit card for the purchase. In this scenario, a location-based service can identify that the particular person is at the merchant because of their handheld device, and a communication with a control engine managing the gift cards can identify that a gift card for the merchant is available for that user. The merchant can receive a photo ID of that patron even before they would pay for their goods/services to provide the enhanced level of service based on the information they receive.

Next, block 208 indicates that the recipient makes a qualifying transaction. An example of a qualifying transaction is simply the recipient using their credit/debit card to purchase dinner at the Olive Garden. The simplicity of this approach is that there is no code, separate physical gift card, or any other step that needs to be taken in order for the recipient to enjoy the benefits of the $50 gift. The recipient simply needs to make the purchase in the normal manner in which they would purchase such an item. The new result of the concepts disclosed herein is a simplification of the giving and redemption of gift cards such that no money is ever lost or failed to be redeemed due to policies that can manage the process of handling any remainder funds such that they are never lost.

Block 210 indicates applying at least part of the amount to the transaction. Assume that the virtual gift card amount was $50 and the transaction was $40. The system applies $40 of the $50 to the dinner at Olive Garden. The system can hold the $10 for future purchases at the Olive Garden or handle the $10 in various other approaches according to the policy for the gift card as described further below. The recipient can establish, via policies, a preference to use only a portion of the gift card amount for a first transaction and reserve the remaining portion of the gift card amount for a second transaction at a later time.

Figure 2B:
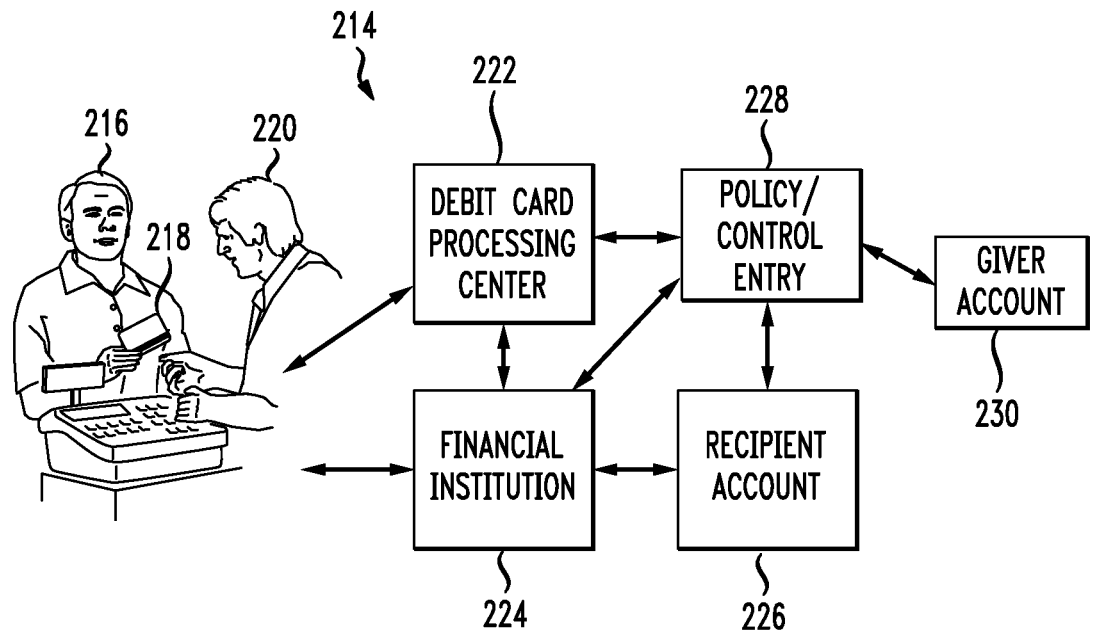
FIG. 2B illustrates an exemplary debit card processing architecture.

The system can apply at least part of the amount to the transaction in a variety of ways. FIG. 2B illustrates an exemplary debit card processing architecture 214. For example, assume the recipient 216 uses a debit card 218 for the qualifying transaction. In the debit card processing infrastructure 214, the recipient 216 presents the debit card 218 to a merchant 220 at a point of sale. The merchant 220 or recipient 216 swipes the debit card 218 through a scanner or otherwise obtains the debit card number, such as by entering the number into a computing device. The merchant system contacts the financial institution 224 indicated by the debit card number, either directly or through a debit card processing center 222. The financial institution 224 verifies that funds are available in the recipient payment account 226 and approves the transaction by immediately (or nearly immediately) withdrawing funds from the recipient payment account 226 and transferring the funds to the merchant 220. In this debit card processing infrastructure 214, if the debit card account only has $20 in the account (and the purchase was for $40), then the policy/control entity 228 can dictate to apply at least part of the gift card amount to the transaction. The system identifies that the recipient wants to use the debit card for a $40 transaction, whereas they only have $20 in their account, the system can credit $20 to the recipient payment account 226 from the giver payment account 230 prior to completing the transaction, at which point the debit card can be used to complete the transaction. If the recipient payment account 226 has sufficient funds, then the system can process the qualifying transaction in a normal fashion, and then credit the recipient payment account 226 the appropriate amount of $40 from the giver payment account 230 after the transaction with the merchant is completed.

In another aspect, a system directly pays the merchant 220 associated with the qualifying transaction at least a portion of the amount from the giver payment account 230 based on the transaction. For example, once the recipient uses their debit card 218 in the qualifying transaction, a separate transaction occurs in which the system pays $40 to the merchant from the giver payment account 230 at the time of the transaction and the $40 does not pass through the particular debit card account of the recipient. Other acquiring banks or intermediate accounts can be used to hold money and process it either immediately or in batch modes at a later time. The particular processing can depend on the characteristics (credit/debit/other) of the giver payment account, recipient payment account, merchant account, acquiring bank account, etc.

Additionally, the recipient can choose to apply the entire gift card amount, part of the gift card or none of the gift card in a purchase transaction. In this way, the recipient can control spending by choosing to pay from their own pocket for a purchase now and save their gift for later, when perhaps a particular item is on sale or when the recipient knows they will need additional funds, such as from a gift card to make purchases. For example, a recipient can inform a merchant to not apply a particular gift at the time of purchase since the recipient knows that on Black Friday the Dremel Multimax power tool at Home Depot will be half off. The recipient knows that Black Friday is a big spending day and that she typically overspends that day. She can choose to redeem her gift card on Black Friday to help control her spending.

Figure 2C:
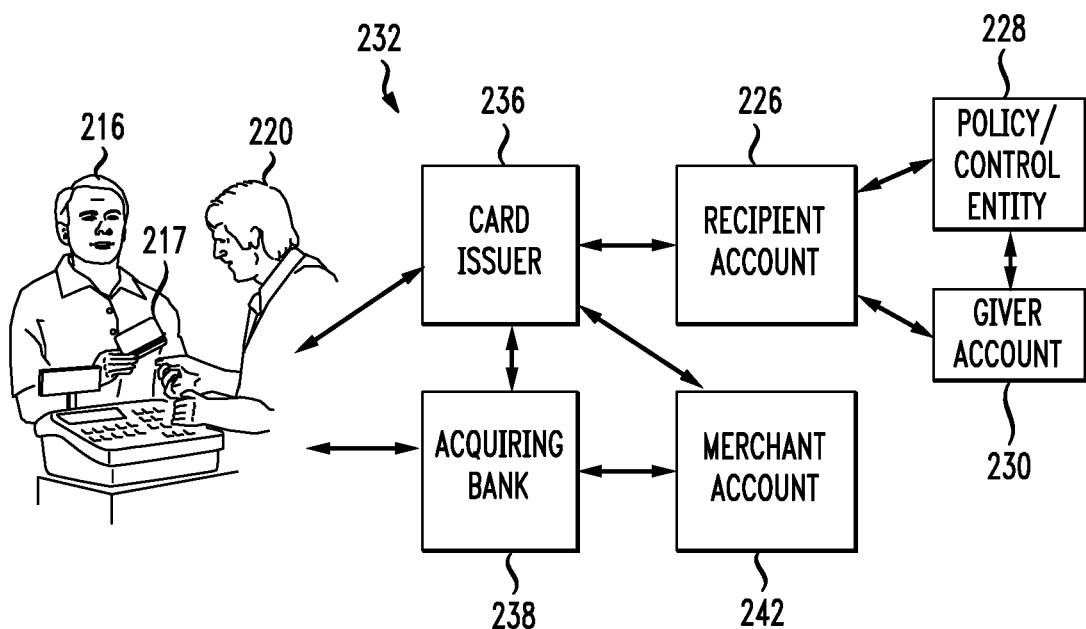
FIG. 2C illustrates an exemplary credit card processing architecture.

FIG. 2C illustrates an exemplary credit card processing infrastructure 232 in which the system can credit the recipient payment account at the time of sale or shortly thereafter. In a credit card processing infrastructure 232, the issuer 236 of the credit card 217 lends money to the recipient 216 to be paid to a merchant 220. In most cases, the merchant 220 and/or the recipient 216 swipes the credit card 217 through a machine known as reader. If the card issuer 236 approves the transaction, an acquiring bank 238, which receives credit card transactions from the merchant 220, then credits the merchant's account 242. A credit card association (not shown) may also be involved to set the terms of transactions for merchants, card-issuing banks and acquiring banks. The merchant 220 can pay the acquiring bank 238 a fee for processing the transaction. Once approved, the card issuer 236 posts the transaction to the recipient's account 226. At the end of the billing period, the cardholder 216 receives a credit card statement from the issuer 236, at which time payment for the transaction is due. In this credit card processing infrastructure 232, the system can credit the recipient payment account 226 when a bill is due, such as a monthly credit card bill, shortly before or on the due date. In this way, the system can hold on to the money, potentially earning interest on the money until the last minute it is needed to satisfy the gift card transaction. This floating period can be one source of revenue to fund the gift card system infrastructure and/or to provide a profit to the operators of the gift card system infrastructure. Also shown in FIG. 2C is a policy/control entity 228 and the giver payment account 230 which are used to communicate with, monitor and manage the gift card transactions according the principles and concepts disclosed herein.

If the system 214, 232 processes gift cards in a batch or delayed mode, it can on a periodic (daily, weekly, monthly, etc) or triggered basis (upon a large transaction, or two weeks after the creation of the gift card, or one week after a known birthday, etc.) review the transaction statement of the recipient to scan for qualifying transactions. For example, if a recipient makes a purchase at the Olive Garden, the structure and data in the credit/debit card statement is known. The system can scan the statements for Olive Garden transactions, identify dates, locations amounts and/or any other relevant data that is needed for a particular policy, and then apply the policy accordingly to transfer money from the giver payment account to the recipient payment account. Again, the variations between giver and recipient payment accounts being debit, credit accounts or other types of accounts can be considered such that the system achieves the transfer of money or available credit or other compensation to the recipient.

The system 214, 232 can process credit cards and apply virtual gift cards in real time (or substantially real time) or in batches. A merchant that processes credit cards typically has a merchant account for receiving credit card payments. If the merchant accepts many credit card payments, the merchant can process credit cards in batches rather than one at a time. In a batch-based approach, the merchant accepts payment via credit card from a customer and submits the payment to the merchant account. Then the acquiring bank, or an organization that accepts payment on behalf of the merchant, checks the customer's name and credit card number for authenticity. The acquiring bank can also check the transaction and the amount with the bank that issued the credit card. The acquiring bank holds onto the payment while validation takes place. If all checks are valid, the system generates an approval code and the merchant keeps that code together with information relating to the sale. The merchant can store authorized cards in batches and send the batch to the acquiring bank each day at close of business and/or at some other interval. The acquiring bank can send the batch to a credit card association (not shown) that debits the customer's accounts and credits the appropriate account. Once the acquiring bank receives payment from the credit card issuer, the acquiring bank pays the merchant, optionally minus a processing fee. Although batch processing can be convenient for a merchant, there are times when he or she may not benefit from it. The same or similar principles can be applied to process virtual gift cards in batches. The virtual gift card processing system can be a separate entity that intercepts the flow of the authorization process, or can be integrated as part of any or all of the acquiring bank, card issuer, merchant point of sale, giver/recipient payment accounts, credit card association control, and so on. In one example, as a gift card is established, a code or a module is established to monitor the recipient purchasing activity using the recipient credit/debit account(s) 226. When a triggering transaction occurs (purchase at a restaurant, particular merchant, or a series of purchases occur), the system can notify the policy/control entity 228 and then receive further instructions on how to consummate the transaction for the gift card and handle any further processes such as remainder amounts of money on the gift card, and so forth. All variations on actual implementation are included within the scope of this disclosure with respect to locations within the system where certain processes take place.

In all of these scenarios, the management of the transaction and transfer of funds are transparent to the giver and the recipient in that the system conducts the actual purchasing in the same way the recipient would purchase the product or service with the debit or credit card and without a separate gift card, code, or certificate. Just as credit card companies receive a small percentage of each transaction, the gift card system disclosed herein can also deduct a small percentage of each gift card transaction, share it with the credit card, or debit card system. The gift card managing entity 228 can obtain payment for use of the gift cards in a variety of ways.

Feature 212 of FIG. 2A is an optional feature that represents a notification to the giver and/or the recipient after the transaction. One example of this step includes providing information on a physical receipt associated with the qualifying transaction, stating something like "Happy Birthday Mom. I hope you enjoyed your dinner." The notification acts as a reminder that the giver provided the virtual gift card for that particular transaction. Email notifications can also be provided to the giver, recipient, and/or a third party. After the giver gives the virtual gift card, the giver may desire to receive a notification when the recipient redeems the. After the giver sends the virtual gift card, the giver can receive an email that identifies that the recipient used the gift card for dinner on a certain date. Any timing mechanism can be applied. Furthermore, the system can send an email or other communication to the recipient after the qualifying transaction that can provide a further personalized message from the giver such as "I hope that you enjoyed your dinner, thanks for all you do." The after purchase notification can also include details about the policy for any remainder amount. The notice can state "I hope you enjoyed your Olive Garden Gift Card! You have $15 remaining on this gift card for your next Olive Garden purchase. After 6 months, if not used, the $15 will be transferred to your debit account automatically [or be cancelled, or be transferred to a third party, or any other option according to the policy]."

Third party notifications are not limited, however, to the merchant and the system can send a notification to any other person or entity. For instance, a brother who gives his sister a gift card for her birthday can instruct the system to notify her husband when she has redeemed it and what it was redeemed for so that the husband does not purchase the same or similar item for her birthday or so the husband can purchase a matching accessory.

The new process outlined in FIG. 2A provides an easier mechanism to transfer a virtual gift card money amount from a giver payment account to a recipient payment account in a manner that is transparent to the recipient. This process can be managed by a specific policy such that even if the gift card amount or remainder is forgotten, it is never lost and always managed according to a policy. Reminders can be sent prior to the remainder amount being cancelled or transferred to an account. The gift card is redeemed through an existing payment mechanism for the recipient and requires no codes, physical gift cards or coupons, and includes policies, reminders or processes to assure no money is forgotten or lost.

Often recipients will have multiple gift cards with varying amounts that they lose track of or have little incentive to redeem. These approaches provide a new result of reducing the barriers to obtaining a greater benefit from a gift card with far less effort on the part of the recipient and/or the giver.

FIG. 3 illustrates an example method embodiment for processing a virtual gift card. The method may be practiced by an individual computing device or a computing device in communication with other computing devices within a network. One or more of the various computing devices can reside in a merchant bank, an acquiring bank, a giver payment account, a recipient payment account, a merchant, credit card association, a policy control entity or engine, and so forth. The system receives an identification of a giver of a gift card and a recipient of the gift card at a first time (302). The system identifies a giver payment account and a recipient payment account for managing the transfer of the amount of money from the giver payment account to the recipient payment account (304) or to a merchant bank according to a policy. The recipient payment account can exist prior to the first time and can be an open-loop payment mechanism that is not restricted to a particular merchant or shopping portal, such as a credit/debit card or checking account. An optional notice is sent to the recipient associated with the transfer of the amount of money to the recipient (306). As is shown above, the giver payment account and the recipient payment account each are an established account such as a Visa, MasterCard or American Express credit card and the like or a debit account. The information that is received in step 302 can further include a transaction processing policy such as how to handle the money amount if the recipient does not engage in a qualifying transaction within a certain period of time, and so forth. The policy can transfer any unused funds in the gift card to the recipient credit/debit card account after six months or based on any timeframe. One alternative to the method described in FIG. 3 is for the system to invite a potential recipient to establish a recipient payment account if one does not exist. The system can send a message in any form such as orally, text message, email, voicemail, etc. inviting the potential recipient to set up an account. The message can explain that someone wishes to give a gift to the potential recipient but that the potential recipient needs to setup an account for the gift giving to occur. The giver remains anonymous or the giver may reveal himself in the request for account setup. The message may optionally include a link to a page requesting the potential recipient's name and credit card information so that the recipient's account can be established easily. This scenario is useful when helping the technologically challenged navigate through the account set-up process.

Another alternative to the method described in FIG. 3 is for the system to set up accounts through another person for children or those that do not have credit/debit cards. For example, a mother can setup a giver or recipient payment account for her teenage daughter who does not yet have a credit/debit card with the mother's card information. The mother can make redeeming purchases on behalf of her daughter. In this way, it is possible to establish user accounts for the technologically challenged or underage givers and recipients.

The system receives information that the recipient has made a qualifying transaction using their existing recipient payment account (308), the transaction occurring at a second time which is later than the first time. The system then applies at least part of the amount of money to the qualifying transaction (310) in a manner according to whether the transaction is a credit or debit transaction for both the giver and the recipient. The system can apply the amount of money to the purchase to yield a remaining amount of money. Upon the recipient using the recipient payment mode to make an additional purchase, the system can apply the remaining amount of money to the additional purchase in a manner associated with the recipient payment mode or transfer the remaining amount to the recipient. Alternatively, the system can apply the amount of money to a purchase by processing a purchase history associated with the payment mode to identify a previously made purchase, and applying the amount of money to the previously made purchase.

An optional feature is the system providing a notification to the giver and/or the recipient (312). In one aspect, a transaction can trigger the use of more than one virtual gift card. For example, if the recipient purchases an item from Home Depot for $95 and has two virtual gift cards to Home Depot, one for $20 and one for $40, then the system can apply all available virtual gift cards up to the purchase price. The system can apply both gift cards for a total of $60 such that the recipient ends up paying $35 for the item.

The system can receive an identification of a giver of a gift card and a recipient of the gift card, and associate the giver with a giver payment account and the recipient with a recipient payment account. The system can associate a policy with the gift card and monitor transactions of the recipient using the recipient payment account. Then the system can receive information based on the monitoring that the recipient has made a transaction using the recipient payment account according to the policy, and apply an amount of money from the giver payment account for the transaction according to the policy.

The system can optionally receive a condition from the giver, and apply the amount of money to the purchase if the purchase satisfies the condition or according to a policy. The system can implement this optional step via one or more policy enforced at a merchant, acquiring bank, control engine, merchant bank, issuing bank, and/or other level in the virtual gift card processing infrastructure. The condition that dictates the policy can restrict the virtual gift card to a retailer, a group of retailers, a geographical region, a class of goods or services, an item, a time range, a date range, and/or a maximum per-transaction value. The system can apply gift cards based on policy limitations. For example, if a recipient has multiple virtual gift cards to a same merchant, when the recipient makes a purchase at that merchant, the system can apply the virtual gift card with the earliest expiration date. Alternatively, the system can credit the merchant at the time of the transaction, and then initiate a dialog with the recipient at a later time to determine which of the available virtual gift cards to apply to the transaction. If the recipient does not indicate which virtual gift card to apply, the system can apply a default virtual gift card. Any entity within the virtual gift card processing infrastructure can subtract a service fee (flat fee and/or a percent) from the amount of money associated with the virtual gift card. The service fee can be a recurring fee, a one-time fee, a per-purchase fee, and so forth.

The system can optionally receive from the giver a request to establish a subscription, the request indicating at least one subscription requirement. Then the system can establish the subscription to automatically apply a subscription amount of money to transactions of the recipient or applies a gift card amount according to a policy based on the at least one subscription requirement. The policy may involve just transferring money from a giver payment account to the recipient payment account. For example, the giver can set up at the beginning of every year a schedule of gift cards one week before the birthday of his or her family members and five best friends. The system can automatically carry out the notice and processing of the gift cards throughout the year. If a parent has a child at college, the gift card can be for any grocery store and a subscription causes $200 to be applied at the beginning of each month. This policy easily enables the recipient to simply use their virtual gift card (credit/debit card) at a qualifying merchant (grocery store) and it is applied on schedule according to the subscription policy.

Givers and recipients can receive notifications associated with the virtual gift card. For example, the system can notify the recipient of at least one of the amount of money, a condition associated with the amount of money, the payment mode, and the giver. The system can also notify the recipient that the amount of money was applied to the purchase, transmit a stored message to the recipient from the giver, and/or send a notification to the giver that the amount of money was applied. Notifications can include a description of an object of the purchase to which the amount of money was applied, a purchase time, a purchase date, and a merchant. The system can send notifications via email, SMS, instant message, tweet, social networking, automated voice call, physical mail, and/or any other suitable communication medium. The giver or recipient can interact with the notifications to be presented with options or information about the current policy for the gift card, and can interact with the notification to change the policy or modify how the gift card will be handled in the future. The recipient may want to regift the remainder amount to a third party and such option can be presented via a notification and then carried out under a new policy for the remainder gift card.

The system can provide for regifting of a virtual gift card by receiving a request from the recipient to transfer at least part of the amount of money to a third party and/or another virtual gift card still belonging to the recipient but having different policies. The transfer can be not as part of a purchase. Then the regifted gift card can then associate the at least part of the amount of money with a third party payment mode. Upon the third party using the third party payment mode, the system applies the at least part of the amount of money to the purchase in a manner associated with the third party payment mode. Part of the gift card may be managed by one policy and another part (the regifted part) by another policy.

Virtual gift cards can include bonus offers from third parties. The system can receive a bonus from a third party and add the bonus to the amount of money. The bonus portion of the virtual gift card can include its own policy or policies separate from other policies associated with the virtual gift card amount, such that when the bonus policy is satisfied on top of the other virtual gift card policies, the system applies both the virtual gift card amount plus a bonus amount to a purchase. The system can also provide notification to the giver, recipient, and/or a third party associated with the bonus was applied by transmitting a stored message to the recipient, for example, from the third party. Such a message can be something like "I added $20 to Dad's gift card for dinner, have a big dessert!" In this manner, the system presents to the bonus giver, if authorized, information about the recipient gift cards and the identity of the primary giver.

The recipient of the virtual gift card can, in some circumstances, manage, change, or remove a policy associated with a virtual gift card. The system can receive a request from the recipient to use the amount of money to make the purchase outside the purchase condition, deduct a penalty from the amount of money according to the purchase condition to yield a reduced amount of money, and apply the reduced amount of money to the purchase in a manner associated with the recipient payment mode. As can be appreciated, the processing system disclosed herein provides much greater flexibility and possibilities when processing gift cards.

Gift Card Processing Infrastructure

Figure 4A:
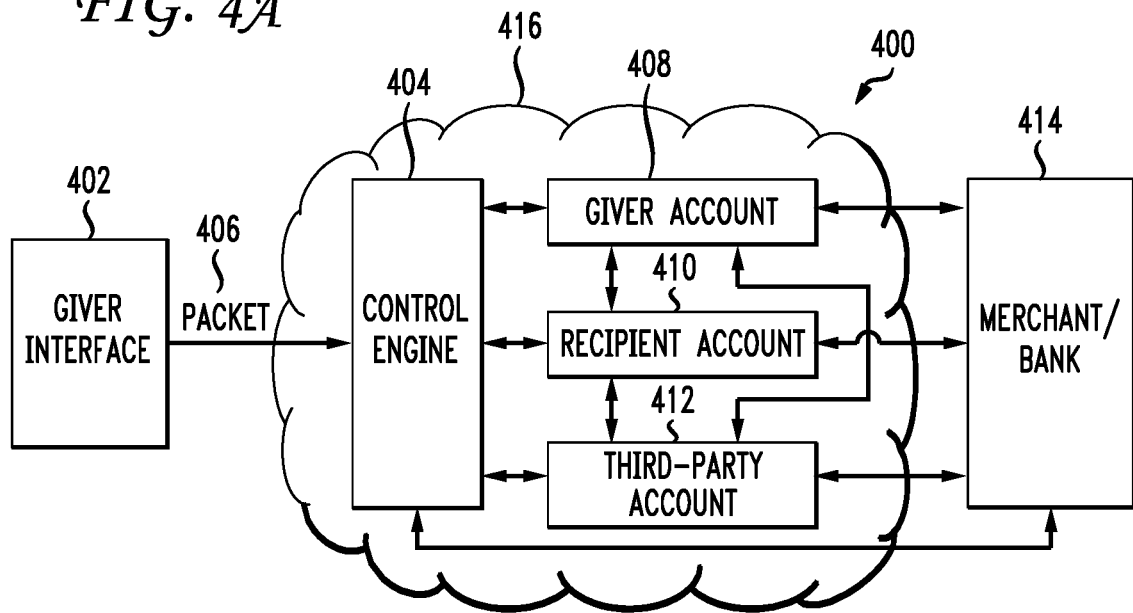
FIG. 4A illustrates a sample system configuration for processing virtual gift cards.

FIG. 4A illustrates an example block diagram 400 of a network 416 in which the system can operate. Network 416 includes various components that make the processing disclosed herein possible. A giver interface 402 is used in a variety of ways to receive initial information about the giver. For example, the giver interface 402 can simply be a web site accessible via a web browser in which there is an opportunity for the giver to provide the basic information to identify the recipient, the amount associated with the virtual gift card and so forth. The giver interface 402 can be a device such as kiosk, ATM machine, or gas pump.

The giver interface can function in different ways as well. A giver can come to a kiosk or an ATM with a physical gift card to use at a company such as the Olive Garden. The giver wants to transfer those funds for use according to the methods disclosed herein, effectively converting a physical gift card to a virtual gift card having a policy for its management. The giver can insert the physical gift card into a card reader of the kiosk that reads the amount left on the card, identifying information for the account and the restaurant such as Olive Garden. The giver can then insert their credit/debit card and the interface would therefore have the necessary information with respect to the giver (which in this case would be the actual physical gift card, a gift code, and/or a gift certificate as the "giver", the recipient, the amount and the recipient payment account). Optionally, the giver only needs to identify the recipient such that the recipient payment account can receive the gift card amount. This interaction enables a same person to be both the giver and the recipient when they have a physical gift card. This process easily facilitates the transfer of those funds from a physical gift card into a virtual gift card allowing usage of those funds via their standard credit/debit card. This provides a way for both givers and recipients to avoid the pitfalls associated with physical gift cards or with gifts requiring gift codes. This transaction, however, in one aspect, does not just transfer the money to the credit/debit card account. If the physical gift card is for the Olive Garden, the system retrieves that information from the gift card and applies it as a policy for the recipient. Therefore, the closed-loop nature of the physical gift card is carried over to the virtual gift card such that it is redeemed only at the merchant. The other aspects of the policy can also be applied, such as after six months of non purchases at the designated merchant, then the money is transferred to the recipient payment account, or any other desired policy.

Similarly, a giver interface 402 can include a website in which a giver types into a web interface a particular gift code that may or may not be associated with a physical gift card. The system can receive this information to identify an amount, the giver, and the company to which the gift card applies. Then the giver can also add their information as the recipient and therefore provide the necessary information via the giver interface for the remaining transactions to occur under the processes defined herein. In this manner, any recipient of a physical gift card can easily transfer that gift card to the virtual gift card system disclosed herein. The recipient no longer has to worry about losing the gift card or forgetting to use all the money on the gift card.

The disclosure temporarily turns to FIG. 4C, which illustrates an example packet 406 as is introduced in FIG. 4A. FIG. 4C shows packet 406 with various data fields. The exact names, types, sizes, and order of data fields in the packet are exemplary. The packet can be implemented in any variation thereof, including any combination or permutation of these and/or other data elements. These example fields include a security header 472, a general header 474, information about the giver 476, information about the recipient 478, a currency amount 480, a payment mode 482, a time associated with the virtual gift card 484, a location or geographic limitation associated with the virtual gift card 486 and another optional field 488 or fields. The amount can be in any currency: domestic, foreign or virtual. The system can automatically handle conversion between currencies, if needed. Some of the packet fields shown are optional. The use of such a packet enables a central control engine 404 to receive a single set of data associated with a gift card and carry out all of the transactions associated with monitoring recipient purchasing activities, apply gift card money as guided by the policy, and credit or debit money from the appropriate accounts.

The packet structure can allow for the information about the giver 476 and the information about the recipient 478 to identify more than one individual. The packet can include information about each giver 476 and recipient 478 in the form of, for example, an email address, name, account number, or other unique identifier. Further, in the case of multiple givers, the amount field 480 can include one or more sub-amounts corresponding to each giver. The payment mode 482 can be identified by credit card number, bank account number, routing number, club or loyalty card number, PayPal address, and so forth. In one case, the payment mode can be a user profile such that any payment mode associated with that user profile is able to use the virtual gift card.

As has been noted above, this packet, in one aspect, does not include any account information or credit card information for the giver or recipient. However, the packet does include a sufficient amount of giver and recipient information such that a control engine 404 can receive that data, and in a secure manner, identify the various accounts that are needed to transfer the money and manage the distribution of the virtual gift card funds as instructed by the packet and/or a policy. The security information 472 can be used according to those of skill in the art to ensure that at the giver interface, a fraudulent giver cannot log into the system and thereby inappropriately gain access to giver, recipient, or third-party accounts. The packet can be transmitted to a secure environment that stores the account data and carries out the transaction.

Based at least in part on data received from the giver interface 402, the system can develop a packet 406 as discussed above and shown in FIG. 9. The packet 406 includes the basic information to manage, create, trigger, or perform other actions associated with the virtual gift card and optionally the additional information. At a basic level, the packet 406 provides information about the giver, the recipient, the amount, and other management information about how the amount is to be applied. The packet can identify whether the giver payment account and recipient payment account are credit or debit accounts. The network 416 receives this packet at a control engine 404. This can represent a computing device, acquiring bank, debit card bank, issuing bank, and/or server within the network 416 that can manage the policy of distribution, use, and/or notifications associated with the virtual gift card. The control engine 404 can be part of or in communication with an acquiring bank. Network 416 can be the Internet, an intranet, a virtual private network, an encrypted network, electronic or fiber-optic network, and/or any other kind of network that can include a wireline or wireless network. Therefore, the giver interface 402 can also be a wireless interface via a wireless device with the appropriate software to enable communication of such information.

The control engine 404 communicates with the giver payment account 408 and a recipient payment account 410 and optionally with a third party account 412 and/or a merchant or bank 414. The control engine 404 can communicate with or operate on any one or more of these systems. For example, the third-party account 412 does not necessarily need to be involved in each transaction. Furthermore, the control engine 404 can optionally communicate directly with the merchant or bank 414. Accordingly, when a giver gives a $50 virtual gift card for the Olive Garden to the recipient, the control engine can utilize a default processing mechanism in which the giver payment account 408 is deducted by $50 and that money is held in a third-party account 412. In an alternate mechanism, the system deducts $50 from the giver payment account 408 and credits the recipient payment account 410 with the $50 directly but with no or some restrictions on that $50. One example of $50 being restricted or reserved is if the recipient payment account is a debit account and the giver has only $75 left in the debit account after the $50 is deposited. If the giver tries to make a $30 purchase, which would leave only $45 in the account, that transaction can be rejected inasmuch as that $50 is reserved and unavailable for use except according to the policy for managing the gift card. In either scenario, when the recipient makes a purchase of $50, for example, at Olive Garden 414, then those funds can be released from the recipient payment account according to the policy, can be successfully processed and the $50 can be paid to the merchant either directly or indirectly. In a direct scenario, the system transfers the $50 to Olive Garden's account. In one indirect scenario, the $50 is paid to Olive Garden directly from the recipient's account, and the system transfers the $50 to the recipient's account, thereby effectively reimbursing the recipient after the fact. Thus, the system handles the transfer of money according to the giver payment account (credit, debit, or other) and the recipient payment account (credit, debit, checking, cash, or other).

As has been noted above, the system can guide the flow of funds from the giver payment account 408 to one or more recipient payment account 410, the third-party account 412 and/or the merchant bank 414 in a number of ways. These varieties are disclosed above and not repeated here. In each case where gift card funds are applied to a purchasing transaction, any of the various scenarios can be used to process the gift card. The gift card funds can also be applied to non-purchase fund transfers. For example, if the recipient chooses to donate to a particular charity, the system can apply the gift card funds, still according to any policies in place, even though the donation is not a "purchase" of a good or service.

Figure 4B:
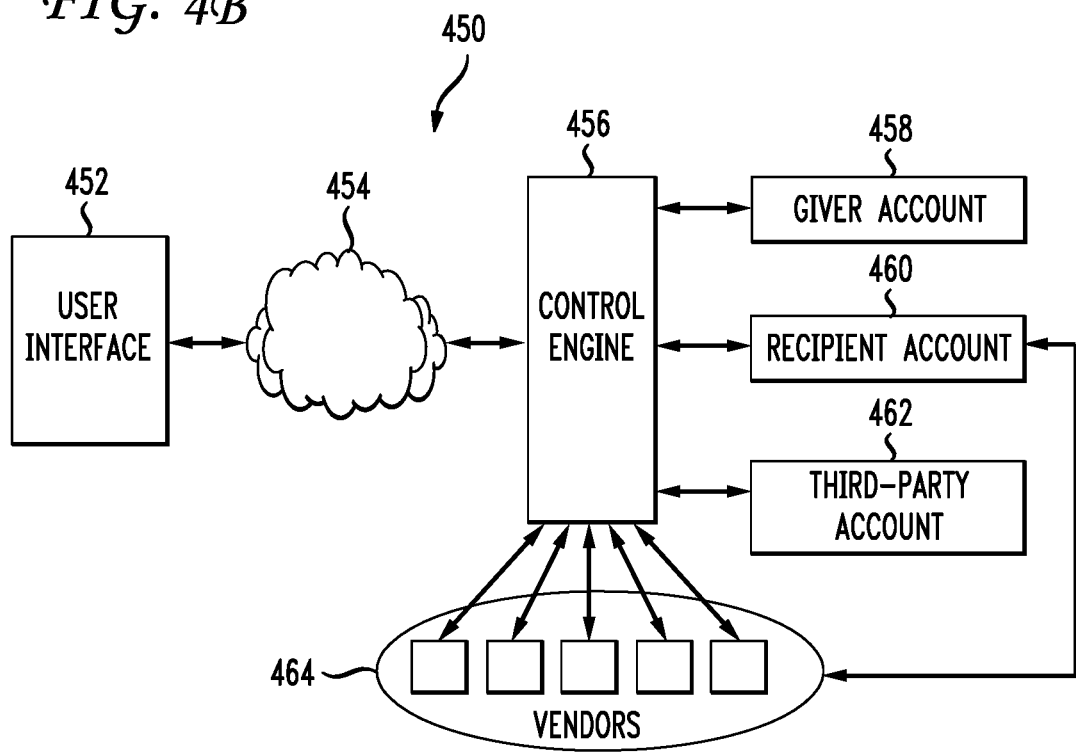
FIG. 4B illustrates a sample system configuration for processing virtual gift cards exclusively in an online retail environment.

FIG. 4B illustrates a second example block diagram 450 of an architecture 450 in which the system can operate. The architecture 450 represents a model operated by an online merchant such as Amazon.com. For purposes of illustration, Amazon is used herein to represent a generic online merchant in which the data about the giver and recipient are stored or received via a user interaction to process a gift card as disclosed herein. A giver of a gift card communicates with the control engine 456 through a network 454 via a user interface 452. The user interface 452 can be a web browser on a desktop computer or mobile device, an application on a desktop computer or mobile device, a telephonic interface, a text-message based interface, a kiosk interface, and so forth. The actual interface details can be implemented in any of a number of different ways, as can be appreciated by one of skill in the art. The giver has an account 458 with Amazon and desires to give a gift card to a recipient having a recipient payment account 460 with Amazon. Each of the user accounts for the giver and the recipient with Amazon can be associated with underlying bank accounts, credit cards, and/or PayPal accounts, for example. In an environment like Amazon, or Visa, MasterCard, PayPal, or any other universe of users in which account information is available, the system disclosed herein can be used to easily identify givers, recipients and apply policies to exchange gift cards easily and seamlessly.

The giver provides instructions to the control engine 456 through the user interface 452 to send a gift card to the recipient. The giver can provide partial information to the control engine 456 to identify the recipient, such as an email address, username or a first name, last name, and mailing address. The control engine 456 and the user interface 452 can provide the giver a way to select which types of information to provide. As the giver enters information, the control engine 456 and the user interface 452 can also provide feedback to the giver regarding the entered information. For example, if the giver enters a mailing address, the control engine 456 can look up the mailing address in the Amazon customer database and determine that three separate user accounts list the same mailing address. Thus, the control engine 456 can indicate to the giver that it needs additional information to disambiguate which of the three separate user accounts is desired and optionally prompt the giver to provide a specific type of information to disambiguate between the three separate user accounts. When the giver has entered sufficient information to identify the recipient, the control engine 456 can display, via the user interface 452, a confirmation of the identified recipient so that the giver is sure that the correct person has been identified. This confirmation can include any information, such as text, images, a purchase history, video, audio, personal metadata, a list of friends, and so forth, pulled from the recipient's Amazon account or other information available publicly or via other channels, such as a social network via an API call.

When the giver has identified a recipient with the control engine 456, the giver also indicates an amount of money to give as a gift card and, optionally, any restrictions, conditions, or limitations on the gift card. The amount can be fixed or dynamic. For example, as discussed above, the amount can be $50 to any item on Amazon.com. Alternatively, the amount can be a gift card including a restriction to a purchase of any HP inkjet printer from Amazon.com, up to a maximum of $200. The actual gift card amount is not determined until the recipient makes a purchase of the indicated item.

Because the control engine 456 controls the gift card implementation based on policies, handles the transactions, and controls (at least indirectly) giver and/or recipient payment accounts, the control engine 404 and the merchant or bank 414 of FIG. 4A are effectively merged into one entity in FIG. 4B. As part of the process of creating a gift card, the control engine 456 can withdraw funds from the giver payment account 458 and place them in a third-party account 462 until the recipient redeems or uses the gift card. Alternatively, the control engine 456 places a hold on the gift card amount in the giver payment account 458 until the gift card is redeemed. The hold can be a reservation of available credit on the giver payment account, which is charged when the recipient redeems the gift card. The control engine 456 can implement other fund processing variations as well. In one aspect, the user accounts 458, 460 at Amazon are proxies for actual bank accounts such that Amazon can deposit, withdraw, hold, and perform other operations on funds in the actual bank accounts. The control engine 456 generates a virtual gift card associated with the recipient payment account 460.

The control engine 456 can provide an optional notification to the recipient via email, the recipient's Amazon account, or some other medium. Then, the control engine 456 monitors each recipient purchase through Amazon.com to determine if the purchase matches the terms, if any, of the virtual gift card. When the control engine 456 detects a qualifying purchase, the control engine 456 can apply the gift card funds to the recipient payment account 460, keep the gift card funds as payment for a product or service Amazon provides, or transfer the gift card funds to one or more vendor 464 of the product or service purchased. The control engine 456 can redirect a payment to a vendor 464 for a purchase so that the purchase is made by the recipient as if the recipient pays with his own account 460 but the control engine 456 performs back-end manipulations to redirect the payment out of the giver payment account 458.

In one variation, the control engine 456 can update the interface for the recipient as the recipient browses the Amazon product catalog. For instance, if the virtual gift card is $50 for any item on Amazon.com, the control engine 456 can automatically reduce the prices listed on the various product pages as the recipient browses Amazon.com to reflect what the price would be if the $50 virtual gift card were applied. Therefore, the product page for a $120 boxed set of DVDs can show $70 instead of $120. If the virtual gift card has conditions, restrictions, or limitations associated with it, the automatically updated prices can reflect that too. For example, if the virtual gift card is $30 for a microwave oven, then the product page for the $120 boxed set of DVDs can still show $120, but a page for a GE countertop microwave oven is reduced by $30. Additionally, the control engine 456 can display automatically and/or manually generated promotions that are only redeemable when purchasing a product or service with all or part of a gift card. For example, Amazon may offer 10% off specific goods or services when purchasing with a gift card. A merchant may refund a certain money amount to Amazon when an item is purchased, thus awarding Amazon for directing sales to the merchant.

Social Media

Figure 5:
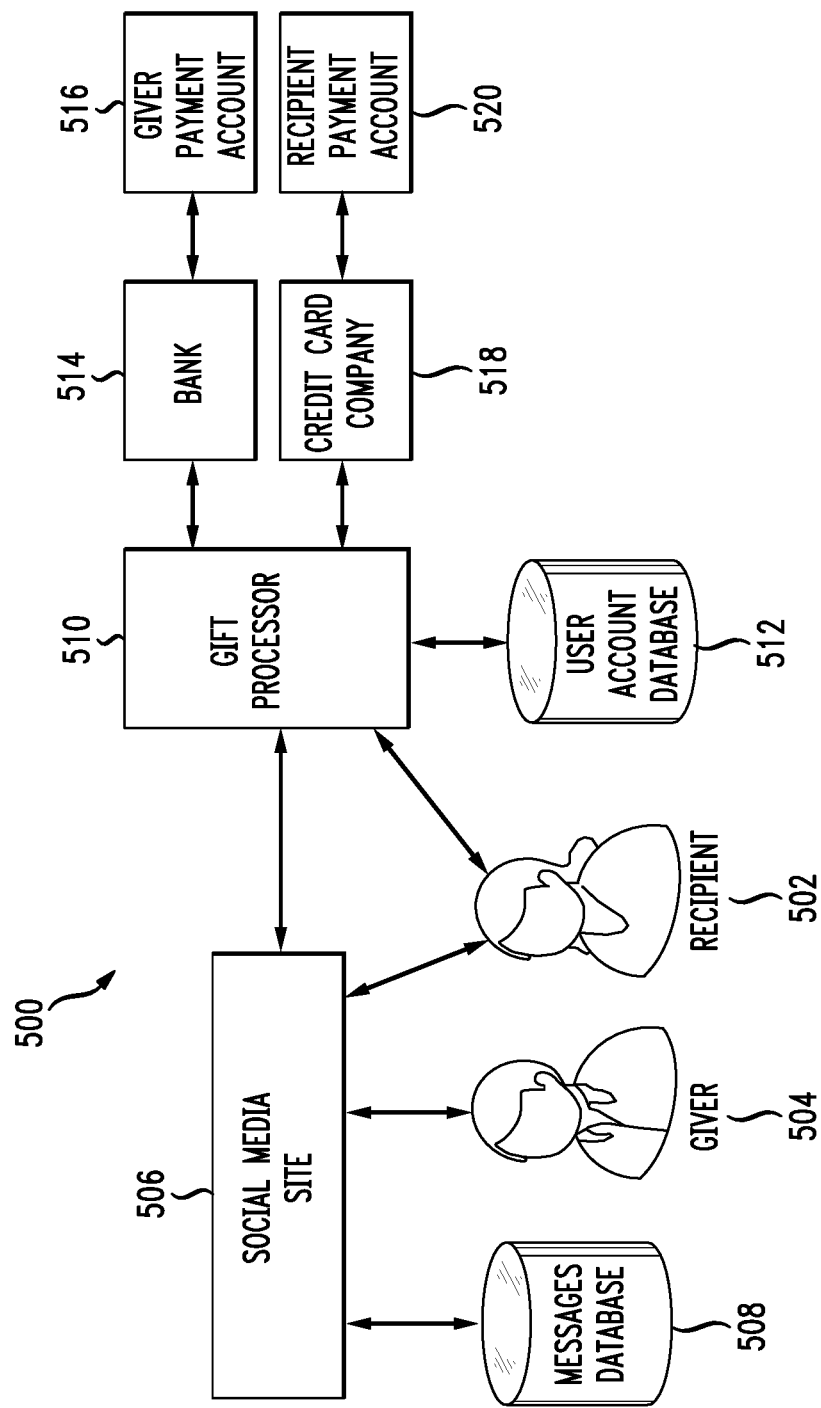
FIG. 5 illustrates an exemplary social media architecture for processing gift transactions.

Social media outlets, such as blogs, Facebook, Twitter, LinkedIn, and others can also facilitate gifts or the giving of money via a policy that monitors transactions of the recipient. Social media can be particularly well suited to giving, receiving, suggesting, and otherwise processing gifts, as they reflect personal relationships in an online realm. Typically, the concept of a gift as disclosed herein is a gift card of the type discussed above. The giver for example is giving a gift of a dinner at Olive Garden, and the recipient just needs to go and have dinner paying for it with their Visa card. FIG. 5 illustrates an exemplary social media architecture 500 for processing gift transactions. In this architecture 500, a giver 504 and a recipient 502 have registered user profiles or are otherwise associated with the social media site 506. The user profiles can include purchasing histories, preferences of restaurants, particular items the user is in the market for or desires to buy or receive as a gift, wedding registry data, credit card and/or debit card or other payment account information, and so forth. Any data that may be useful for giving or receiving a gift card as disclosed herein can be included as part of the user profile. As the recipient 502 and the giver 504 converse on the social media site 506, the social media site 506 stores their messages in a message database 508.

As a simple example, a social network such as Facebook can establish that posts using the word "GiveAGiftTo" trigger a gift. Thus, a giver can post "GiveAGiftTo recipient for Olive Garden for $50". Facebook can recognize the reserved word "GiveAGiftTo" and trigger a gift processing service to parse the post, extract the information necessary, and possibly conduct a confirmation or disambiguation process with the giver. After the details are ready, the system can establish a policy for the gift, optionally notify the recipient, and, upon a qualifying transaction using the recipient's payment account, apply the gift to the recipient's payment account according to the policy.

The recipient 502 can instruct the gift processor 510 to link his user profile on the social media site 506 with a recipient payment account 520 through a credit card company 518. The gift processor 510 stores this link in a user accounts database 512. The payment account can be any payment account such as debit, credit, PayPal, etc. Thus, the credit card company represents any entity that provides a link to the user profile and a payment processing mechanism.

The gift processor 510 and/or the social media site 506 monitor messages to detect a message that triggers a gift. For example, the social media site 506 can receive parameters from the gift processor 510 or other source for initiating a gift, and can monitor posts as users create them. The social media site 506 can notify the gift processor 510 upon detecting a post that matches the parameters. Alternatively, the gift processor 510 can periodically poll the message database 508 through an API for the social media site 506. When a message is found that triggers a gift, the gift processor 510 parses the message and/or metadata associated with the message to extract gift parameters, such as the giver, the recipient, an amount of money, and/or policy requirements. Based on the information extracted from the message, the gift processor 510 establishes a policy for handling the gift. When the recipient makes a purchase using the recipient payment account 520 that satisfies the policy, the gift processor 510 effects a transfer from the giver payment account 516 through the bank 514 to the recipient payment account 520 through the credit card company 518 or directly to a merchant account associated with the purchase. The gift processor determines the applicable accounts for a gift based on information from the social media site and from the user accounts database.

For example, the social network, such as Facebook, can implement a reserved word of "giveagift" for setting up a gift from the posting party as a giver to a recipient. The giver can post on the recipient's wall "giveagift 40 Olive Garden. Have a happy birthday!". Facebook monitors posts for the reserved word "giveagift" and, upon encountering that post, parses out the amount, $40, a merchant associated with the gift, Olive Garden, and infers the recipient based on where the post was placed, i.e. the recipient's wall. Facebook relays that information to the gift processor to establish the policy such that when the recipient makes a qualifying purchase using the recipient account, the gift amount of $40 is applied to the qualifying purchase from the giver payment account. Remainder amounts not used will be processed as disclosed herein to be returned either to the giver or the recipient or for other purposes according to the policy.

Figure 6:
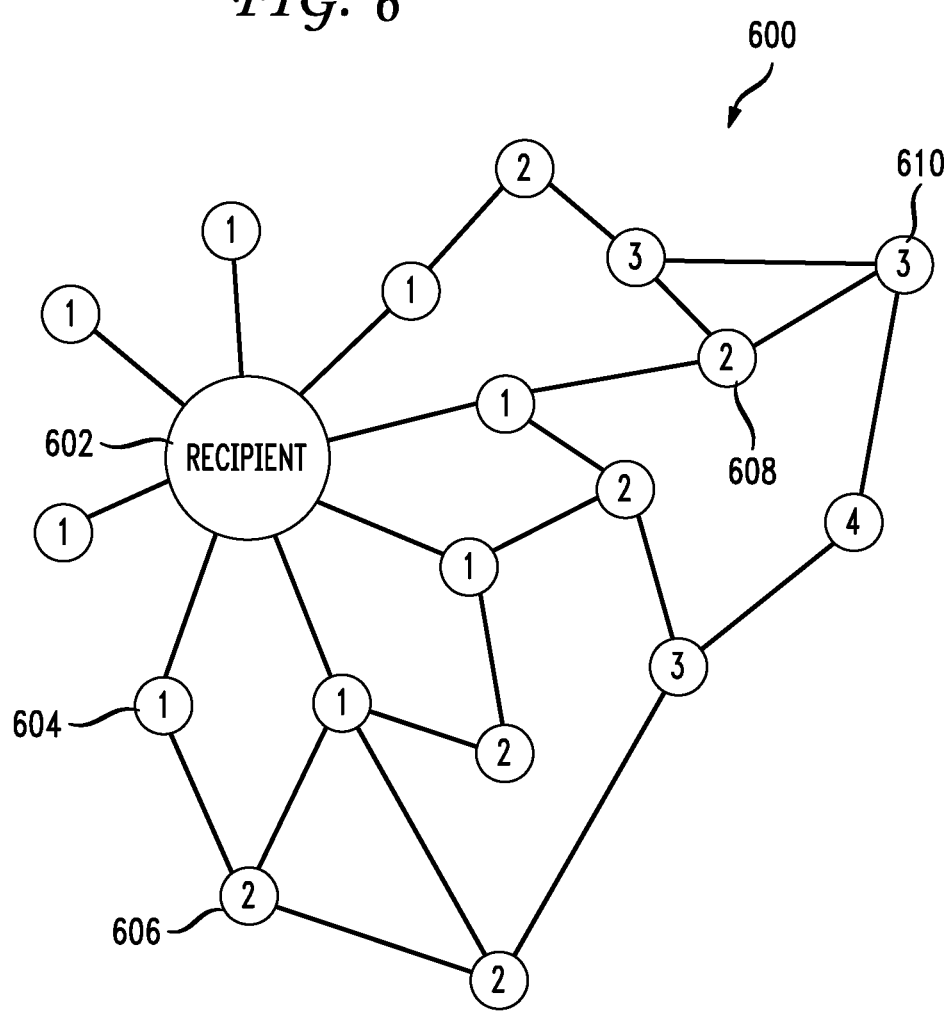
FIG. 6 illustrates an example social network graph.

The reserved word can be active for a limited time or only for a limited number of users. For example, a user can establish a reserved word of "TomBirthday" on Facebook, even if another user has that same reserved word active at the same time on Facebook, so long as the sets of individuals to which the reserved words apply do not overlap. A large social network can have hundreds of millions of users having constantly changing relationships, so the reserved word can be extended beyond a user's immediate social graph. FIG. 6 illustrates an example social network graph 600. The recipient 602 is associated with a reserved word, which applies to the immediate connections marked 1, such as connection 604, and second connections marked 2, such as connection 606. Some connections link back to the recipient 602 via more than one path, in which case the shortest set of links should be used. Connection 608 is marked 2 because the shortest path is 2 links back to the recipient. To avoid accidentally or unintentionally triggering a gift, the social network can apply a threshold distance to the reserved word so that even if connections outside that threshold distance use the reserved word, they do not trigger a gift. For example, if the threshold distance is 2, then even if connection 610 which is marked 3 uses the reserved word in the social network, the social network does not classify the communication using the reserved word as intending to create a gift.

Similarly, to avoid those within the threshold distance sending a gift they did not realize or intend, the social network can confirm that intent before implementing the gift or the policy or before communicating with the gift processor. For example, if the social network detects that a first degree connection has posted using a reserved word, the social network can provide a popup asking for confirmation of the parameters of the gift. If Polly posts "I can't wait for Tombirthday" as a typo, and that matches a reserved word, the social network can display a message "Your post will trigger a $20 gift to Tom for Best Buy based on your use of the reserved word 'Tombirthday'. Confirm or deny?" Polly can then click deny, correct her typo, and repost, or she can confirm. Additionally, instead of a reserved word, a user can set up a completely separate gift recipient entity, so that posting on the wall of the gift recipient entity or sending a message to the gift recipient entity, for example, triggers a gift. In this aspect, the concept includes a gift recipient entity that is established as though the entity were a person in the social network. The gift recipient entity identifies a social media message from a giver having an associated giver payment account that existed prior to the social media message, wherein data associated with the social media message is used to identify a recipient having an associated recipient payment account that existed prior to the social media message and a policy. The system, through the gift recipient entity, can determine a gift amount based on the data. The system then monitors transactions using the recipient payment account according to the policy, wherein when a qualifying transaction occurs, at least a portion of the gift amount is applied to the recipient payment account. The gift recipient entity can be persistent and continue to exist after the recipient has made the qualifying purchase or the conclusion of the gift process, in which the purchase is made by the recipient, can automatically cause the system to delete the gift recipient entity from the social network. In another aspect, the gift recipient entity can be converted to another type of entity such as a "thank you for the gift" entity that enables users to continue to talk about the gift and how the recipient is enjoying or enjoyed the gift within the social network. In this aspect, the characteristics and functions of the gift recipient entity can change and morph throughout the gift process. Example phases include a gift recipient entity, a gift thank you entity, a gift return entity, a regifting entity (for transferring the gift from one recipient to another recipient), and so forth. In each case, the entity participates in the social network as though it were a person so that it can interact with other people in the network, but it also carries with it a particular function associated with processing the gift.

FIG. 7 illustrates example Twitter messages 700 for establishing, contributing to, and spreading gifts via a social media outlet. In this example, a recipient establishes parameters for contributing to a gift, but others besides the recipient can establish these parameters as well. The #symbol, called a hashtag, is used to mark keywords or topics in a Tweet as a way to categorize messages. The @ symbol, called 'at', is used to denote a reply to or a mention of a specific user in a Tweet. Thus, users can exploit these conventions when giving gifts in a Twitter context. In one example, a gift Twitter account is established to receive requests to set up gift hashtags. Thus, the message 702 enabling a hashtag for a gift states "@gifts tweet #ouranniversary $20 to contribute to our 50th anniversary bash". The gift Twitter account receives this Tweet and parses out the desired hashtag and hashtag parameter, which can be separate or part of the hashtag. If the user requested hashtag is already taken, the gift Twitter account can tweet back to the user to try again or can tweet back a replacement hashtag for triggering a gift. If the desired hashtag is not taken, the gift Twitter account reserves the hashtag and starts monitoring tweets using that hashtag.

Message 704 states "#ouranniversary $20 Congrats guys! Have a great second honeymoon in Jamaica". The hashtag in this case matches the reserved hashtag, so the gift Twitter account passes that information to a gift processor, which sets up the policy so that the recipient can make a qualifying purchase using their recipient payment account to redeem the gift. The payment for the gift is drawn from the giver's preexisting and independent payment account. Message 706 states "#ouranniversary $100 Here's to many more". The gift Twitter account parses this message, which is for $100 instead of the default $20. In some cases, especially on Twitter, a user wants to retweet the original recipient message 702 to spread the word. The gift Twitter account can ignore messages that are retweeted, such as message 708 which states "RT @recipient #ouranniversary $20 to help recipient out on their 50th anniversary". This message is not intended to create a gift, but to share the original tweet with others.

These principles are discussed in terms of a single social network, but can easily be applied to messages spanning multiple social networks. For example, a gift processor can monitor a user's connections on multiple social networks, via their respective APIs, for posts or messages containing instances of a specific reserved word to create a gift. In any of these contexts, the social network itself or the gift processor can perform a confirmation or authorization routine to ensure that a user intended to form the gift and that the parameters extracted or deduced for the gift are correct. If a user, either the giver and/or recipient, does not have a registered or linked payment account with the gift processor, then the gift processor and/or the social network can prompt the user to register or link an existing payment account.

Figure 8:
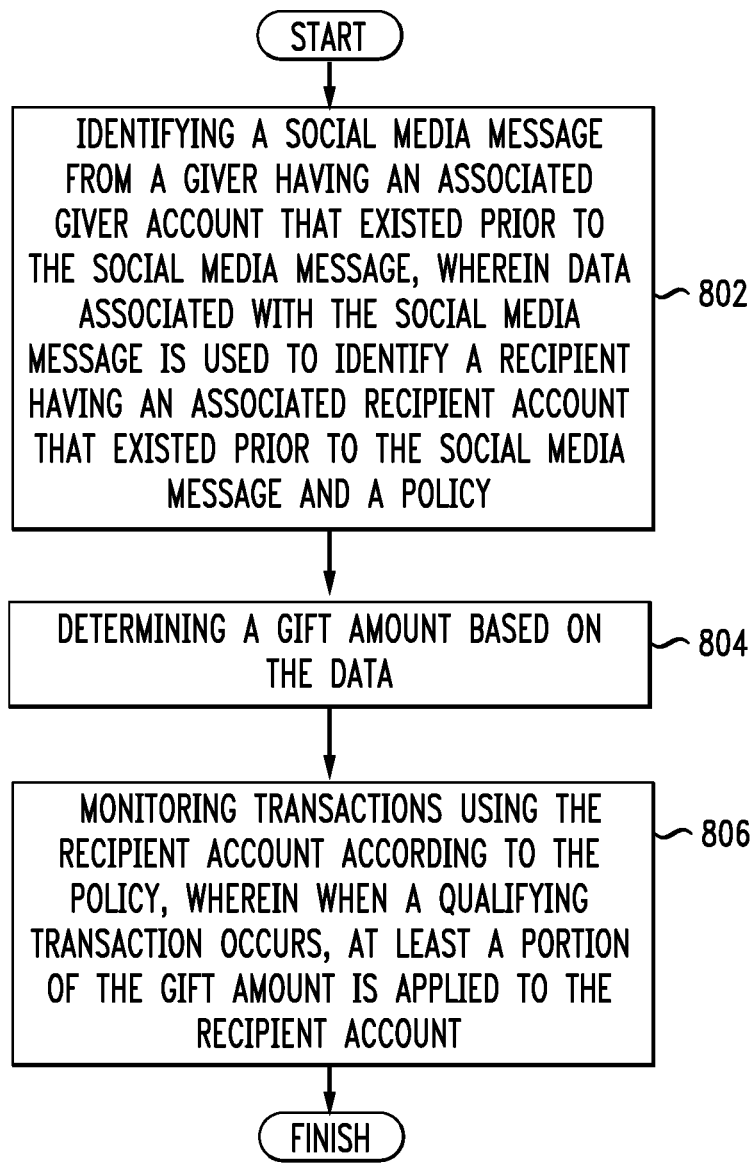
FIG. 8 illustrates a first example method embodiment.

FIG. 8 illustrates an example social media based method embodiment. This method can include these and other steps in any combination, permutation, or sub-combination. A system configured to practice the method identifies a social media message from a giver having an associated giver account that existed prior to the social media message, wherein data associated with the social media message is used to identify a recipient having an associated recipient account that existed prior to the social media message and a policy (802). The social media message can be a tweet, a Facebook posting, a text message, a video message, an image, a tag, a friend request, metadata, and/or any other communication via a social network. If the social media message is a tweet, the data can be a hashtag, and the gift amount can be determined based on a parameter associated with the hashtag. The parameter can be separate, such as "#gift 20" or can be incorporated into the hashtag, such as "#giverecipient20bucks". The gift amount can be implied from the hashtag based on a set of parsing rules for the hashtag or based on natural language understanding of the hashtag.

The system 100 determines a gift amount based on the data (804). The recipient or other entity can generates the data. The system 100 monitors purchase transactions by the recipient or using the recipient account according to the policy, wherein when a qualifying transaction occurs, at least a portion of the gift amount is applied to the recipient account (806). The system can determine at least one of the recipient account and the giver account based on a social media profile at a social networking service hosting the social media message. The giver and the recipient can be connected on a social networking service hosting the social media message.

FIG. 9 illustrates another social media embodiment. In this example, the system receives at a social networking service a request to establish a standard for receiving a gift amount, the request being from a recipient having a recipient payment account registered with the social networking service (902). If the standard is valid, the system establishes the standard (904). The standard can be a particular structure of a tweet that when people use, will be processed to establish a gift transaction associated with recipient purchases. The system then monitors posts to the social networking service from users other than the recipient, such that when one of the posts matches the standard, the system establishes a policy such that at least a portion of a gift amount is transferred from a giver payment account associated with a giver creating the one of the posts to the recipient payment account when the recipient makes a qualifying purchase using the recipient payment account (906).

In one example of this method, a charitable organization wants to purchase an ambulance for a hurricane-devastated small town. The charitable organization can establish a standard with Twitter, designating a structure for others to tweet to contribute to the purchase of the ambulance. The standard can be, for example, "#ProjectAmbulance $amount". Twitter can analyze the standard, ensure that the reserved words are not in common use for instance, and implement the policy for a definite or indefinite duration. Twitter and/or the charitable organization can then advertise the standard to other users. When Twitter detects tweets matching the standard, such as "#ProjectAmbulance $20" or "#ProjectAmbulance $5", then the system treats the user associated with the tweet as a giver and the charitable organization as the recipient, such that when the charitable organization makes the qualifying purchase of the ambulance, the gift amount specified in the tweet is applied to the charitable organization.

The particular structure prevents or at least significantly reduces the chances of accidental donations and allows for advertising the standard without contributing. For example, a promotional tweet can say "tweet #ProjectAmbulance and the amount you want to donate to help out". Because the tweet does not match the standard (i.e. "#ProjectAmbulance $amount"), even though part of the standard is used, that tweet would not trigger a donation.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data that cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of executable instructions or associated data structures represents examples of corresponding acts implementing the functions described in the steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or a combination thereof) through a communications network. In a distributed computing environment, program modules can reside in local and/or remote memory storage devices.

The various embodiments described above are provided by way of illustration only and should not be construed to limit the scope of the disclosure. For example, the principles herein are applicable to virtual gift cards associated with any type of payment mode, including cash, checks, credit cards, debit cards, loyalty cards, and so forth. The principles herein can be applied to any virtual gift card that can be redeemed by using a payment mechanism to make a purchase in the normal fashion without the recipient using a separate physical card or entering a code. Any function disclosed herein in connection with one embodiment can be blended or incorporated into another embodiment. Given generally that redemption of a virtual gift card is managed by a policy, any policy features discussed above can be blended to provide new policies, although such new policy is not specifically set forth in a single discussion of any embodiment. Those skilled in the art will readily recognize various modifications and changes that may be made to the principles described herein without following the example embodiments and applications illustrated and described herein, and without departing from the spirit and scope of the disclosure.

We claim:

1. A method comprising:
   identifying, at a first time and via a processor, a social media message from a giver of a gift having an associated giver payment account that existed prior to the first time;
   identifying a recipient based on data associated with the social media message, the recipient having an associated recipient payment account that existed prior to the first time and that existed prior to an initiation of a process to give the gift, wherein the giver payment account and the recipient payment account are independent of each other and have no control over each other;
   identifying, based on the data, a gift amount;
   creating the gift by associating, via a processor and in response to the social media message, a policy with the gift, wherein the policy is at least in part giver defined; and
   initiating, at the first time and via a processor, a transfer of at least part of the gift amount from the giver payment account to a holding account that is separate from the recipient payment account;
   monitoring, via a processor, in a continuous manner, and according to the policy, purchases using the recipient payment account at a second time, which is later than the first time, to yield purchasing information;
   based on the purchasing information, determining, via a processor, whether a qualifying purchase has occurred using the recipient payment account; and
   when the qualifying purchase occurs, transferring, via a network-based server and in an automated manner, at least part of the gift amount from the holding account to the recipient payment account.

2. The method of claim 1, wherein the social media message is a tweet.

3. The method of claim 2, wherein the data is a hashtag.

4. The method of claim 3, wherein the gift amount is determined based on a parameter associated with the hashtag.

5. The method of claim 3, wherein the gift amount is implied from the hashtag.

6. The method of claim 1, wherein the recipient generates the data.

7. The method of claim 1, wherein at least one of the recipient payment account and the giver payment account is determined based on a social media profile at a social networking service hosting the social media message.

8. The method of claim 1, wherein the giver and the recipient are connected on a social networking service hosting the social media message.

9. A system comprising:
   a processor; and
   a memory storing instructions that, when executed by the processor, cause the processor to perform operations comprising:
   identifying, at a first time, a social media message from a giver of a gift having an associated giver payment account that existed prior to the first time;
   identifying a recipient based on data associated with the social media message, the recipient having an associated recipient payment account that existed prior to the first time and that existed prior to an initiation of a process to give the gift, wherein the giver payment account and the recipient payment account are independent of each other and have no control over each other;
   identifying, based on the data, a gift amount;
   creating the gift by associating, in response to the social media message, a policy with the gift, wherein the policy is at least in part giver defined; and
   initiating, at the first time, a transfer of at least part of the gift amount from the giver payment account to a holding account that is separate from the recipient payment account;
   monitoring, according to the policy and in a continuous manner, purchases using the recipient payment account at a second time, which is later than the first time, to yield purchasing information;
   based on the purchasing information, determining whether a qualifying purchase has occurred using the recipient payment account; and
   when the qualifying purchase occurs, transferring in an automated manner at least part of the gift amount from the holding account to the recipient payment account.

10. The system of claim 9, wherein the social media message is a tweet.

11. The system of claim 10, wherein the data is a hashtag.

12. The system of claim 11, wherein the gift amount is determined based on a parameter associated with the hashtag.

13. The system of claim 11, wherein the gift amount is implied from the hashtag.

14. The system of claim 9, wherein the recipient generates the data.

15. The system of claim 9, wherein at least one of the recipient payment account and the giver payment account is determined based on a social media profile at a social networking service hosting the social media message.

16. The system of claim 9, wherein the giver and the recipient are connected on a social networking service hosting the social media message.

17. A non-transitory computer-readable storage medium storing instructions which, when executed by a computing device, cause the computing device to perform operations comprising:
receiving at a social networking service a request to establish a standard for receiving a gift amount, the request being from a recipient having a recipient payment account registered with the social networking service, wherein the recipient payment account existed prior to initiating a process to receive the gift amount, and wherein the standard comprises a social network distance;
when the standard is valid, establishing the standard to yield an established standard; and
monitoring, in a continuous manner, posts to the social networking service from users other than the recipient, such that when one of the posts matches the established standard, a gift is created by establishing a policy such that the operations comprise transferring in an automated manner at least a portion of the gift amount from a giver payment account associated with a giver creating the one of the posts to the recipient payment account when the recipient makes a qualifying purchase using the recipient payment account according to the policy.

18. The non-transitory computer-readable storage medium of claim 17, wherein a post of the posts in the social networking service is a tweet.

19. The non-transitory computer-readable storage medium of claim 18, wherein the established standard is a hashtag.

20. The non-transitory computer-readable storage medium of claim 19, wherein the gift amount is determined based on a parameter associated with the hashtag.

\* \* \* \* \*